Nov. 27, 1951 E. P. RUDKIN 2,576,145
VOLUME EXPANSION SYSTEM FOR AUDIO AND LIKE AMPLIFIERS
Filed Jan. 14, 1947 8 Sheets-Sheet 1

INVENTOR
ERIC P. RUDKIN
BY
ATTORNEY

Nov. 27, 1951  E. P. RUDKIN  2,576,145
VOLUME EXPANSION SYSTEM FOR AUDIO AND LIKE AMPLIFIERS
Filed Jan. 14, 1947  8 Sheets-Sheet 3

INVENTOR
ERIC P. RUDKIN
BY
ATTORNEY

Nov. 27, 1951 E. P. RUDKIN 2,576,145
VOLUME EXPANSION SYSTEM FOR AUDIO AND LIKE AMPLIFIERS
Filed Jan. 14, 1947 8 Sheets-Sheet 4

INVENTOR
ERIC P. RUDKIN
BY
ATTORNEY

Nov. 27, 1951  E. P. RUDKIN  2,576,145
VOLUME EXPANSION SYSTEM FOR AUDIO AND LIKE AMPLIFIERS
Filed Jan. 14, 1947  8 Sheets-Sheet 5
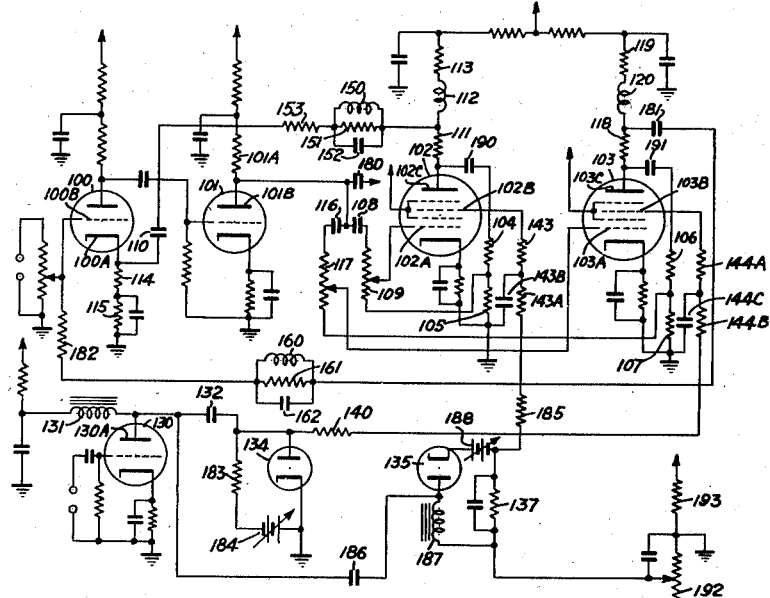
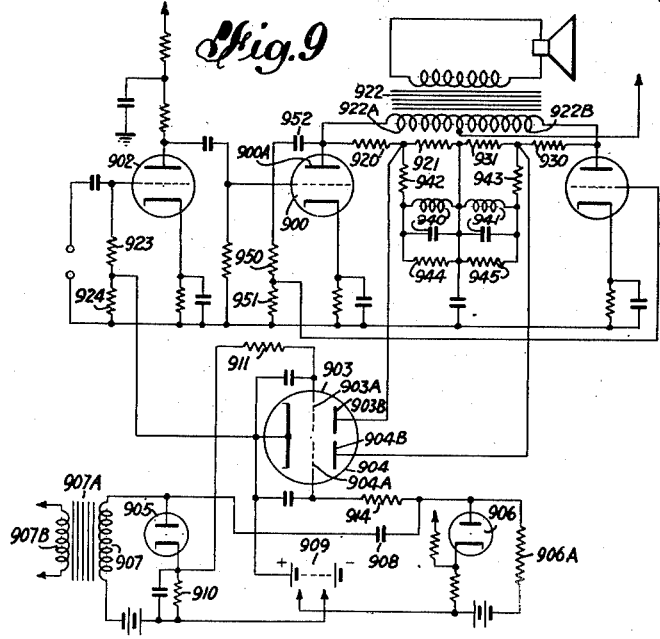
INVENTOR
ERIC P. RUDKIN
BY
ATTORNEY Nov. 27, 1951  E. P. RUDKIN  2,576,145
VOLUME EXPANSION SYSTEM FOR AUDIO AND LIKE AMPLIFIERS
Filed Jan. 14, 1947  8 Sheets-Sheet 6

INVENTOR
ERIC P. RUDKIN
BY
ATTORNEY

Nov. 27, 1951  E. P. RUDKIN  2,576,145
VOLUME EXPANSION SYSTEM FOR AUDIO AND LIKE AMPLIFIERS
Filed Jan. 14, 1947  8 Sheets-Sheet 7

INVENTOR
ERIC P. RUDKIN
BY
ATTORNEY

Nov. 27, 1951            E. P. RUDKIN            2,576,145

VOLUME EXPANSION SYSTEM FOR AUDIO AND LIKE AMPLIFIERS

Filed Jan. 14, 1947            8 Sheets-Sheet 8

INVENTOR
ERIC P. RUDKIN
BY
ATTORNEY

Patented Nov. 27, 1951

2,576,145

UNITED STATES PATENT OFFICE 2,576,145

VOLUME EXPANSION SYSTEM FOR AUDIO AND LIKE AMPLIFIERS

Eric Peter Rudkin, London, England, assignor to International Standard Electric Corporation, New York, N. Y., a corporation of Delaware Application January 14, 1947, Serial No. 721,895
In Great Britain December 6, 1945

Section 1, Public Law 690, August 8, 1946
Patent expires December 6, 1965

19 Claims. (Cl. 179—171)

This invention relates to automatic volume expansion systems for use with audio or like amplifiers as employed in radio or like receivers, or large scale sound reproducing or public address equipment.

More particularly this invention relates to audio frequency amplifying systems of the kind wherein means are provided for automatically increasing the amplification existing from the input to the output terminals thereof in proportion to the instantaneous amplitude of the applied input audio signal to be amplified, or in other words, to audio frequency amplifying or reproducing systems of the kind wherein the gain thereof is automatically regulated in proportion to the instantaneous amplitude and in the same sense as the variations in amplitude of the applied input audio signal to be amplified.

It is a particular object of the present invention to provide in a system of the kind just referred to an adjustable range of gain variation over the full range of variation in amplitude of the input audio signal with a high maximum value of gain variation consistent with the introduction of a minimum degree of amplitude or harmonic distortion at any gain level. It is moreover an especial object of the invention to provide a full expansion effect on loud (or fortissimo) passages of music or speech and in particular expansion of such passages without the introduction of the kind of distortion just referred to which would otherwise completely spoil the desired effect, a drawback which is prevalent with a number of existing systems of automatic volume expansion systems.

It is a further object of the invention to provide in an audio frequency volume expansion system of the above kind, means for adjusting the rate of gain variation with respect to input audio signal amplitude or in other words to provide means of regulating the nature of the expansion characteristic, that is to say for regulating the shape and slope of the curve illustrating the relationship between amplifier gain and input audio signal amplitude whereby widely different aural effects may be secured from the reproduced signal.

It is a still further object of the present invention to provide in an automatic volume expansion system of the kind above referred to, means for automatically regulating the tonal or frequency response of the amplifier at different volume levels whereby the aural defects of the ear in responding disproportionately to the upper audio or treble frequencies in relation to the lower audio or bass frequencies at high volume levels and or in deficiently responding to the bass frequencies in relation to the treble frequencies at low volume levels is substantially compensated for.

It is a still further object of the invention to arrange in a system of the kind above referred to, for the operation of the expansion system to be as nearly as possible instantaneous, that is to say, one in which the gain variations occur as nearly as possible instantaneously with respect to variations in input audio signals amplitude, whereby as nearly as possible a full expansion effect is secured on loud transient passages. In particular it is an object of the present invention to provide as nearly as possible an instantaneous increase in gain in response to an increase in audio signal amplitude together with an adjustable rate of decline or fall of gain as the amplitude of the input signal diminishes ranging from an instantaneous decline in gain to a comparatively low rate of decline in gain as the amplitude of the said input signal diminishes. For reasons to be given later in this specification however, the latter condition of operation is, from a technical viewpoint, to be avoided and the rate of decline in gain should from this viewpoint follow, as nearly as possible instantaneously on the decline in amplitude of the input audio signal, and provision for this is made in all the examples of the invention described hereinafter in this specification.

According to this invention, an audio frequency or like volume expansion system, comprises a thermionic valve amplifying system means for introducing positive audio frequency feed-back or regeneration from a later point to an earlier point in said amplifier, means for introducing negative feed-back or degeneration from the same or a different point in said amplifier as that from which said positive feed-back is taken, to the same or a different earlier point therein to which said positive feed-back is applied, and further means for controlling independently or conjointly the relative degrees of feed-back existing in either of said paths as the amplitude of said input signal is varied whereby the overall gain of said amplifier is caused to vary in the same sense as and proportionately to the variations in amplitude of said input audio signal.

According to a principal method of carrying the invention into effect the degree of feed-back existing in the said regenerative or positive feed-back path is caused to vary in the same sense as the variations in amplitude of the input audio signal whilst the degree of said negative feed-back or degeneration is caused to vary in reverse sense to the variations in amplitude of the said input signal. In other words, the relative degrees of audio frequency regeneration and degeneration in operation over the circuits of the amplifier are differentially controlled in relationship to the variations in input signal amplitude, whereby the overall gain of the amplifier is caused to vary in the same sense as the said variations in input signal amplitude, an automatic volume expansion effect operating at a high maximum rate over a wide maximum range being thereby achieved.

According to a further method of carrying the invention into effect the degree of said negative feed-back or degeneration is initially adjusted or preset to reduce the gain of the system in the absence of a signal to a medium or low value, the automatic contrast control voltage being disconnected from the feed-back controlling means associated with the said negative feed-back path, and the degree of said opposing positive feed-back or regeneration is caused to automatically vary in the same sense as the variations in said input signal amplitude producing a resultant variation in the overall gain of the amplifier in proportion to the instantaneous amplitude of the applied input audio signal.

In a still further method of carrying the invention into effect either of the above two methods of operation may be employed, whilst simultaneously and in addition, further negative feed-back is applied over pentode or tetrode valve output stages for the reduction of the effective amplitude and harmonic distortion which commonly occurs with this type of stage, means being provided for causing this negative feed-back to be held constant or to increase with audio signal amplitude. In the latter case the variations in negative feed-back which occur, produce per se, the opposite effect to volume expansion, that is, volume contraction and accordingly in order to secure an overall resultant volume expansion effect either of the above two methods of automatic feed-back control i. e. differential control of positive and negative feed-back or control of positive feed-back per se and applied over the penultimate stage or stages is caused to vary the gain of these stages at a greater rate than the opposing variations in gain produced by the above said variations in negative feed-back applied over the output stage or stages.

It will be clear from the foregoing that a still further method of operation of the invention is possible wherein the automatic feed-back controlling means associated with the positive feed-back or regenerative path has its automatic control voltage circuit disconnected, after which the positive feedback circuit is adjusted to supply a fixed or preset degree of positive feed-back to the amplifier to bring the gain of the system to a maximum stable value, i. e. as close to the audio oscillation point as is necessary to realise a substantial increase in gain over the gain of the amplifier without feed-back, negative feed-back being then applied over the said negative feed-back path above referred to to reduce the gain of the system to a medium or low value, the degree of said negative feed-back in operation being thereafter automatically controlled in the manner already described with reference to the foregoing modes of operation i. e. the degree of said negative feed-back in operation being automatically controlled in opposite sense to the said variations in said input signal amplitude whereby the overall gain of the system is caused to vary in the same sense as the variations in amplitude of the said input signal, a volume expansion effect operating over a wide range being thereby achieved.

In any of the above methods of operation of the invention separate and independently adjustable delays may be applied to the automatic feed-back controlling means associated with either of the said feed-back paths, whereby the degree of positive feed-back does not commence to increase until the amplitude of said input audio signal reaches an arbitrary predetermined value and/or the degree of said negative feed-back does not commence to diminish until the amplitude of the said input signal reaches the same or a different arbitrary predetermined amplitude. Adjustment of the relative extents of these delays together with adjustment of the absolute degrees of positive and negative feed-back in operation enables a measure of adjustment of the shape in the automatic volume expansion characteristic to be effected.

According to a further feature of the invention, also as set forth in the provisional specification, the automatic contrast control voltages may be derived from a rectifier or rectifiers coupled to the output of an auxiliary audio amplifier having its input circuit coupled through adjustable audio frequency attenuating means e. g. a potentiometer, to the input circuit of the main audio amplifier. In addition, the gain of the said auxiliary amplifier may be controlled directly and to an adjustable extent in accordance with the applied input audio signal amplitude and in the same sense as the variation in said input signal amplitude by means of a control voltage applied to suitable automatic gain controlling means associated therewith and derived from a rectifier coupled either to a point in the main audio amplifier or to the output circuit of a further auxiliary amplifier in a manner analogous to that described in the British Patent No. 518,128 relating to automatic gain control systems. With this arrangement i. e. wherein the gain of the auxiliary amplifier is automatically controlled, the volume expansion characteristic may be regulated by adjusting the degree of automatic control voltage applied to control the gain of the auxiliary amplifier and/or the delay in this control as obtained for example by applying an adjustable delay voltage to the rectifier controlling the gain of the said auxiliary amplifier.

In a system in accordance with the present invention therefore there is provided substantially as set forth in the provisional specification an audio frequency amplifying system comprising a plurality of thermionic valve stages in cascade, a first feed-back path arranged from the output of one such stage to the input circuit of the same or a preceding stage and supplying positive feed-back or regeneration to the system, that is to say, the phase of the voltages fed back from the output of said one stage to the input circuit of said stage or said earlier stage is identical with the phase of the audio frequency voltages existing in the input circuit of the said stage or said earlier stage, and a second feed-back path arranged from the same or another of said thermionic valve stages as that from which said positive feed-back voltages are taken, to the input circuit of the same stage or that of an earlier stage and operating to supply negative feed-back or degeneration to the system, that is to say, the voltages fed back from said one stage are in reverse phase to those existing on the input circuit of said stage or said earlier stage, and means operating to increase automatically the degree of feed-back existing in said first or positive feed-back path and to decrease simultaneously the degree of feed-back existing in said second or negative feed-back path as the amplitude of said input audio signal increases and vice-versa, the operation of the whole arrangement being such that the effective overall gain of said amplifier increases as said input audio signal amplitude increases and vice-versa. In other words, the respective degrees of positive and negative feed-back applied to the amplifier are automatically and differentially controlled in accordance with the instantaneous amplitude of the applied input signal such that, the effective gain of said amplifier is caused to vary in the same sense as the variations in said audio signal amplitude.

As alternative methods of operation of the above system, either the degree of positive or negative feed-back is held fixed at an arbitrary predetermined value, and the other, that is the negative or positive feed-back respectively, is varied automatically in the reverse or the same sense respectively as the variations in amplitude of the applied audio signal. These additional alternative methods of operation hereinafter referred to as unilateral operation or control have already been described in some detail with reference to the outline example of the invention given in the earlier part of this specification and will be readily understood by those skilled in the art as applied to the more specific examples of this invention to be given hereunder.

Before proceeding to give a detailed account of the various practical embodiments of the invention an attempt will be made to give an account of some of the drawbacks attending on some recently proposed systems of contrast expansion depending on the principle of controlled negative feed-back alone, that is to say, systems in which the gain variations are effected solely as the result of automatically controlled inverse feed-back. This method has numerous disadvantages as compared with the system proposed in this invention and employing controlled positive feed-back or audio frequency regeneration as an alternative or in addition to the automatic control of inverse feed-back above referred to.

In the first place, in order to secure a reasonably wide expansion range with the above recently proposed system, a considerable degree of initial negative feed-back must be applied to the circuits of the main audio amplifier and this has the effect of bringing the average overall audio gain of the amplifier, in the absence of an input signal, to a comparatively low value. In order to secure a full expansion range with this system therefore, whilst retaining a reasonable degree of amplifier gain, additional low frequency stages must be provided to compensate for the loss of gain due to the initially applied negative feed-back. Furthermore, the shape of the volume expansion characteristic obtainable with this arrangement is such that the upper extremity thereof is curved towards the horizontal axis, or, in other words, a linear expansion characteristic is only secured over a restricted initial range of applied input audio signal and for passages of greater amplitude exceeding this restricted range, (in particular peak or transient passages of large amplitude, e. g. fortissimo passages of music) the volume expansion or gain increase is no longer proportional to input audio signal amplitude, and in the case of peak signals of sufficiently large amplitude to cause the applied negative feed-back to be entirely cut off, this gain increase upon which the expansion effect depends, is reduced to zero, i. e. the expansion characteristic is no longer sloping upwards from left to right, but instead runs horizontal i. e. parallel to the input signal amplitude axis corresponding to zero expansion on passages of maximum amplitude. Furthermore, this system is frequently shown as applied to pentode or tetrode audio amplifying stages and as is well known to those skilled in the art, both amplitude and harmonic distortion (particularly third harmonic), is introduced on account of the curvature of the control characteristic obtaining with this class of valve; the percentage distortion increasing with input signal amplitude. As is also well known, it is common practice to include a fixed degree of negative or inverse feed-back from the output to the input circuits of this type of valve stage to offset this resulting distortion at the expense of a reduction in gain. In the known system of contrast expansion relying on the automatic control of negative feed-back alone however, and employing this type of valve, as is frequently the case to offset the resulting loss of initial gain due to the use of this system, the degree of negative feed-back applied is automatically reduced as signal amplitude increases, i. e. where it is most required to offset distortion. With this known system therefore wherein pentode or tetrode valves are employed to offset this reduction in gain the percentage harmonic distortion increases with the degree of expansion and hence the amplitude of the applied input signal, a very undesirable result. Although this unwanted effect can be rendered to negligible proportions by the use of triode valves throughout the circuits of the amplifier, it becomes necessary to compensate the resulting loss in gain by the addition of at least one and preferably several additional amplifier stages to restore the average gain of the system to a reasonable value in the absence of an input signal, i. e. particularly in the case wherein a large degree of negative feedback is applied to secure a wide range of expansion. Summarizing the disadvantages of the known system above referred to, consists firstly in that the maximum expansion range obtainable on peak signals is limited by consideration of the maximum gain of the amplifier stages over which feed-back is applied i. e. the gain of these stages without feed-back, whilst no expansion effect is obtainable on peak signals of sufficient amplitude to entirely cut off the applied negative feed-back. With this known system furthermore, it is difficult if not impossible, to correct for the decline in slope of the expansion characteristic which sets in at large levels of input signal amplitude without sacrificing to an excessive degree, the initial gain of the amplifier obtaining in the absence of an input signal or to adjust in any way the shape of the expansion characteristic in order to enable a particular aural effect to be secured.

In systems in accordance with the present invention however, the inclusion of an additional channel of controlled positive feed-back enables the disadvantages enumerated above to be entirely overcome. Moreover, through special design of the positive feed-back circuits, it is possible to secure a uniform lift in gain over the entire range of useful audio frequencies without excessive gain at any one frequency due to reactive resonance setting in until the absolute limit in gain corresponding to the audio frequency oscillation point is reached; a region which is not employed in practise as it is possible to secure an ample increase in gain of over 100 times with only a moderate degree of positive feed-back applied, corresponding to a region considerably removed from the point at which audio frequency oscillation sets in. Furthermore, through the inclusion of this system of positive audio frequency feed-back, it becomes possible to employ triode valves throughout the various stages of the controlled amplifier thereby enabling the full advantages in the matter of linearity of control characteristic obtainable with this class of valve, to be realised, whilst simultaneously providing where necessary, an ample reserve of audio gain in the absence of an input audio signal even with only a restricted number of stages. Due to the fact that the control characteristics of the triode valves employed in the individual stages of the amplifier and in particular in the stages over which the positive feed-back is applied remain substantially linear over a wide range of input signal amplitude variation, the introduction of positive feed-back does not produce any deterioration in the quality of reproduction, in fact, the reverse holds true and an improvement in quality together with a great increase in realism of the expansion effect on loud passages is obtained.

Due to the employment of this system of effective audio frequency regeneration, it is no longer necessary to compensate for deficiencies of gain which otherwise occurs with triode stages when employed in only limited numbers by the use of pentode or tetrode valves in the controlled stages, and in consequence, the harmonic distortion which is in evidence with this class of valve is avoided.

In order to secure the effective action of the positive feedback circuits, two fundamental design factors had to be taken into account. In the first place, the amplitude of the feed back voltages applied over the positive feed-back circuit had to be arranged to remain as nearly uniform as possible over the entire spectrum of useful audio frequencies necessary for reasonably high fidelity reproduction, e. g. from 50 to 10,000 cycles. Secondly, incidental phase shift of the feed-back voltages which otherwise occurs when feed-back is applied over a plurality of valve stages as the applied input audio frequency increases, had to be reduced to a minimum and the residual amount neutralised. The means for compensating for this phase shift effect forms an essential feature of the present invention as otherwise, the stray capacities existing in shunt with the various resistive load impedances of the amplifying and feed-back stages, tends to produce the effect of serious phase shift of the feed-back voltages towards the upper end of the audio frequency scale and which, if not compensated for, would cause a phase shift in the positive feed-back voltages in the region of these frequencies of at least 180 degrees, producing in effect, negative feed-back instead of the desired positive feed-back and in the case of the negative feed-back circuit, a similar phase shift, which, if unallowed for has the effect of producing positive feed-back instead of the desired negative feed-back at these frequencies.

According to the present invention, the phase shift which occurs with respect to frequency is, in the first place, held at a minimum value, firstly, by reducing the number of stages over which feed-back is applied to the minimum necessary, secondly, by employing resistance-capacity coupling throughout the circuits of the controlled amplifier and feed-back stages, and thirdly, by avoiding the use of excessively high values of load resistances in the coupling circuits between the amplifier stages in order to reduce to the lowest possible extent the reactive shunting effect thereacross of the stray capacities above referred to and existing in shunt with the said coupling load resistances and due principally to the valve inter-electrode capacities and to the operation of the well known Miller effect, whereby the anode impedance of a given stage is effectively reflected in modified form across the grid circuit impedance through the medium of the grid-anode capacity of the valve. As the use of high values of load resistance has the desirable effect of still further improving the linearity of the dynamic operating characteristic, a compromise has to be struck in the choice of the values of load resistance for a given stage between the desirability of keeping the resistive load low in comparison with the reactance of the stray capacities located thereacross whereby the phase shifting effect of the latter as frequency increases is reduced to a minimum and that of extreme linearity in operating characteristic taking into account the power which the stage is required to handle. Since the operating characteristics of triodes are reasonably linear, the former is the most pressing requirement and accordingly the values of load resistance chosen in the case of the stages over which feed-back is applied are arranged to be on the low side in comparison with the anode A. C. resistance of the valve.

It now remains to describe the arrangements adopted in the present invention for compensating for the residual phase shift which occurs towards the upper end of the audio frequency scale and due to the causes above-described.

According to this invention, the said residual phase shift occurring at these frequencies is offset or neutralised by the inclusion of just sufficient inductive reactance in series with the resistive load impedances of any of the stages located in the chain of feed-back, preferably that included in the anode circuit of the feed-back controlling valve stage. In general, the value of inductance included in series with the load impedance of at least one of the stages over which the feed-back is applied, is just sufficient to produce resonance with the stray capacities in shunt therewith at a frequency in the region of the highest audio frequency it is desired to reproduce, in this case, 10,000 cycles. By suitably adjusting the reactive impedance, i. e. the relative values of the resistive inductance and capacity included in the interstage circuits of the stages of the main amplifier over which feed-back is applied and the feed-back circuits per se, that is to say, the relative values of these elements included in the complete chain of feed-back, it is possible to adjust the natural frequency of the feed-back circuits, that is to say, in the case of the positive feed-back circuit, the audio frequency at which self-oscillation occurs when the positive feed-back is increased sufficiently to produce self-oscillation, to practically any value within the audio frequency spectrum. An incidental effect of this is, that an increasing degree of boost occurs at this natural frequency of the feed-back circuits as the degree of positive feed-back is increased towards oscillation point. In practice as already indicated above, the positive feed-back circuits are not operated close to the point of audio frequency self-oscillation even at maximum gain, as an ample reserve of audio frequency gain can be secured from the positive feed-back when only a moderate degree of this is applied and an increase in overall gain of at least 100 times or 20 decibels is readily secured without even remotely approaching the region of self-oscillation. The boost effect occurring at the resonant frequency of the positive feed-back circuit is therefore not appreciably in evidence over the operating region of the feed-back circuits. Automatic regulation of the frequency response as the gain level is varied is secured separately from the above effect according to this invention, by the inclusion of high-pass filters or the electrical equivalent of such filters and provided with means for adjusting the frequency attenuation characteristic thereof in series with either feed-back circuit in the manner above referred to.

In systems in accordance with the present invention therefore, the overall gain of the main amplifying system is not limited to that obtainable by the amplification from the valve stages alone but is augmented by controlled positive feed-back, the degree of which is arranged to increase automatically with signal amplitude whilst simultaneously, the degree of negative feed-back applied over the negative feedback circuit may be simultaneously arranged to automatically decrease or is held constant at an arbitrary predetermined value.

In the former case wherein the negative feed-back is arranged to decrease simultaneously with the increase in the positive feed-back, the two kinds of feed-back are hereinafter referred to as being differentially controlled in accordance with input signal amplitude; one of the advantages arising from the adoption of this form of control residing in that the maximum rate of change of gain with respect to input signal amplitude (or in other words the slope of the expansion characteristic), realisable is, at least double that which obtains in the case wherein either the positive or the negative feed-back is held constant whilst the other is automatically varied under the influence of the input audio signal amplitude. All the methods of operation referred to above however, fall within the scope of the present invention, although it should be noted that the first mentioned method, i. e. differential control, is illustrated in the practical embodiments of the invention to be described hereunder with reference to the accompanying drawings. The latter two methods of operation may, however, be readily arranged for in each case by disconnecting the automatic contrast control voltage from the feed-back controlling valve associated with either the positive or negative feed-back path and presetting the degree of feed-back existing in the other (that is to say the negative or positive feedback paths respectively), to the value required by the feed-back attenuating controls provided.

With reference to the drawings,

Fig. 7 illustrates another embodiment of the invention wherein differential valve controlled feed-back is applied over the circuits of the output and penultimate stages;

Fig. 8 illustrates another circuit arrangement embodying the invention and including the provision of means for the automatic regulation of frequency response with respect to signal amplitude;

Fig. 9 illustrates a still further circuit arrangement embodying the invention;

Figure 10:
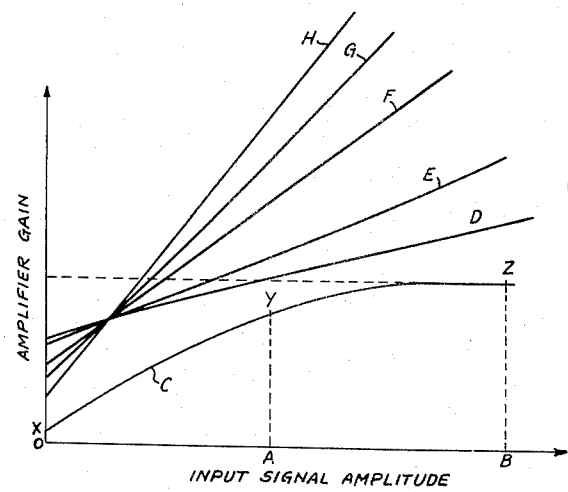
Fig. 10 illustrates some characteristic curves illustrating the operation of the invention.

Referring now to Fig. 10 of the complete specification there are shown therein several forms of automatic volume expansion characteristic curves obtainable with arrangements in accordance with the present invention as compared with that obtaining in the case of the known system relying for its operations solely on the control of negative feed-back.

Referring to Fig. 10 the horizontal axis represents input signal amplitude, whilst the vertical axis represents overall amplifier gain. Curve C illustrates the kind of expansion characteristic obtainable with the known system relying solely on the principle of controlled negative feed-back. As will be seen from an inspection of curve C, in order to secure an adequate range of expansion the initial gain of the amplifier is, in the absence of input signal, depressed by the application of a predetermined amount of negative feed-back to some point "X" corresponding to a comparatively low value of gain, e. g. 15 decibels or thereabouts. As input signal amplitude increases, the negative feed-back is attenuated to an increasing extent giving a substantially linear expansion characteristic over the lower region represented by XY and corresponding to a range of input signal amplitude from zero to OA, after which, for further increases in input, signal amplitude from A to B, the rate of increase in gain is no longer linear and the characteristic steadily curves over as indicated by the upper part of the characteristic YZ where BZ represents the normal gain of the amplifier without feed-back, i. e. with feed-back completely cut-off and which occurs for a value of input signal amplitude corresponding to OB which may be only from 50–75% of the maximum or peak value of input signal which may be encountered. An inspection of the curve C reveals that the expansion characteristic remains substantially linear over the lower region corresponding to the range of input signal amplitude represented by OA, but for maximum values of peak input signal ranging from OA to OB the expansion characteristic is no longer linear and a full expansion effect is not obtained. It is also clear that, in order to obtain the linear region of expansion over the range of input signal represented by OA, the initial gain must be depressed to the low initial value represented by the ordinate OX. For maximum input signals, the maximum expansion obtainable is limited by the value of the amplifier gain without feed-back. Furthermore, the rate of expansion over the range of input signal represented by OA is represented by the slope of the lower part of the characteristic XY which is limited. The disadvantages of the system are therefore seen to be firstly, in the form of a restricted expansion range, secondly, the low value of initial amplifier gain necessary to secure this range, thirdly, the absence of the full expansion effect on maximum or peak values of input signal where it is most desired, and fourthly, a restricted rate of expansion.

By way of comparison, various volume expansion curve characteristics obtainable with systems in accordance with the present invention are shown at D, E, F, G and H, from which it will be seen that in order to secure a wide range of expansion it is not necessary to depress the initial gain of the amplifier to a very low value and in practice an initial value of gain corresponding to 50–75% of the gain without feed-back may be employed, whilst in addition, a full and if desired, an increasing expansion effect is obtainable on maximum or peak values of input signal. Curves D to H represent the volume expansion characteristics obtaining for increasing settings of the expansion control provided and, as will be seen from the slope of curve H, a high maximum rate is obtainable and which, moreover, is maintained up to even comparatively high values of input signal amplitude as obtains, for example, on passages aproaching maximum or peak amplitude as represented by OB.

In the case above referred to wherein the initial gain is held at a value of from 50–75% of the normal gain of the amplifier without feed-back, the full expansion effect is secured through the action of positive feed-back increasing automatically with signal amplitude. As already indicated above, this process may give rise to an increase in overall gain of some 100 times giving an expansion range of some 20 decibels, in addition to that obtained through the initial variation of the applied negative feed-back which, in this case, represents a maximum range of gain variation of only 2–1. With this adjustment of the system, the input should be adjusted by the input volume control to a sufficiently low value to prevent overloading of the first controlled valve on the peak values of input signal. By increasing the initial degree of negative feed-back applied to the same extent as cited in the example above given with reference to the known system, the range may of course, be readily increased by at least a further 10 decibels giving a total expansion range of over 30 decibels—more than would ever be required for ordinary requirements. In both instances, especially the latter, the output stage must be capable of handling the expanded signal without sign of distortion or overloading. For this reason, the output stage must be capable of handling a large grid swing without distortion; the most suitable design for this purpose being provided by triodes of the power or super power type connected in push-pull. A full description of the circuit arrangements to be employed in a number of practical embodiments of the invention is given hereunder with reference to the accompanying drawings in which some typical circuits are illustrated.

Figure 1:
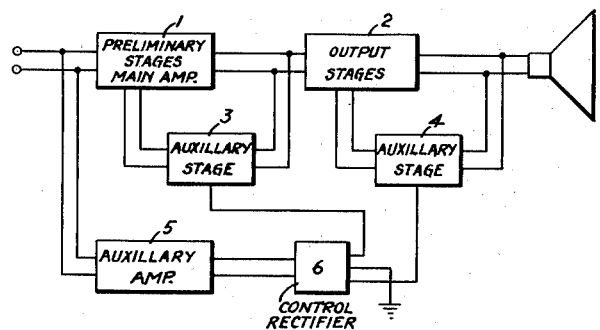
Figure 1 is a schematic diagram of one general arrangement in accordance with the present invention.

Referring now to Fig. 1 of the drawings, there is shown therein schematically one possible arrangement in accordance with the present invention. Referring to Fig. 1, the preliminary stages of the main amplifier which may be resistance capacity coupled triode stages are represented diagrammatically at 1 the output of which feeds into the input circuit of the output stages of the amplifier represented at 2. An auxiliary valve stage or stages represented at 3 has its input grid coupled to the output circuit of the preliminary stages 1 and its output anode circuit coupled either to an intermediate point in the preliminary stages 1 or directly to the input circuit of these stages. The phase of the audio frequency voltages fed back through the stages 3 from the output to the input circuits of the preliminary stages 1 is arranged to be identical to supply positive audio frequency feed-back or regeneration to the stages 1, the degree of such feed-back in operation being controllable by adjustment of the amplification or transconductance of the stage 3. A further auxiliary valve stage 4 has its input grid coupled to the output circuit of the output stage 2 and its output anode circuit coupled to the input circuit of this stage, the phase of the voltages fed back through this stage 4 being the reverse of those existing in the input of the stage or stages 2 thereby supplying negative feed-back or degeneration to this stage, the degree of which in operation may be controlled by regulating the amplification or transconductances of the stage 4. In operation, the relative gains or transconductance of the auxiliary stages 3 and 4 (hereinafter referred to as feed-back controlling stages) are differentially controlled by control voltage of opposite sign derived from a differential contrast control rectifier 6 which is in turn fed with signal energy from the output of an auxiliary amplifier 5 having its input circuit connected through adjustable attenuating means to the input circuit of the preliminary stages 1.

The control voltage applied from the differential contrast control rectifier 6 to control the gain of the stage 3 supplying positive feed-back is positive in sign whilst a negative control voltage is applied from the differential rectifier 6 to control the gain of the stage 4 supplying negative feed-back to the output stage or stages 2. A delay may be provided on the control rectifier controlling the gain of the stage 3, such that the positive feed-back applied over the preliminary stages commences to increase, just before the negative feed-back applied over the stage 2 is completely cut-off. The initial degree of negative feed-back applied over the stage 4 may be sufficient in the absence of a signal to reduce the gain of the system to any desired extent below its normal value without feed-back. In operation, the negative control voltage applied to the stage 4 increases as signal amplitude increases, thereby steadily cutting off the negative feed-back and thereby producing a steady rise in the overall gain of the system. Just as the horizontal part of the expansion characteristic of the negative feed-back controlling stage 4 is approached, the delay applied to the rectifier controlling the gain of the positive feed-back stage controlling 3 is overcome and a steadily increasing degree of positive feed-back commences to be applied over the stages 1 producing a steady increase in gain of the amplifier, this being above the ordinary level which obtains without feed-back. As an alternative method of operation which gives an increased expansion rate over the method just described, the delay on the positive feed-back controlling rectifier may be omitted and the positive feed-back applied over the stage 1 increases simultaneously as the negative feed-back applied over the stage 2 is cut off. In this case the input should be limited to a maximum value of approximately 50% of that obtaining in the case of the former method of operation, since due to the increased expansion rate obtaining through the simultaneous differential control of the two forms of feed-back, a full expansion range is now obtained over a smaller range of input signal amplitude variation.

Either of the above two methods of operation may be employed with any of the circuit arrangements to be hereinafter described by the simple expedient of regulating the delay voltage applied to the control rectifier controlling the operation of the automatic feed-back controlling means associated with the positive or regenerative feed-back path. By supplying values of delay voltage to the said rectifier intermediate between the above two stated values, i. e. ranging from zero to the value necessary to cut off the positive feed-back until the initially applied negative feed-back is almost completely cut off, a number of different forms may be imparted to the expansion characteristic. The latter result may also be secured by applying a delay voltage to the rectifier controlling the negative feed-back path which is greater in value than that applied to the rectifier controlling the positive feed-back path, although the shapes of expansion characteristic so obtained are the reverse to those obtaining in the former case above referred to wherein the delay voltage applied to the last mentioned rectifier is greater than that applied to the former rectifier.

In a modification of the arrangement of Fig. 1, an additional feed-back controlling stage may be connected in parallel with the positive feed-back controlling stage 3 and adapted to supply negative feed-back from the output to the input circuit of the preliminary stages 1, whilst the gain of this additional negative feed-back stage may be controlled from the same point as that from which the stage 4 is controlled or preferably from an independent rectifier also coupled to the output of the auxiliary amplifier and provided with an independently adjustable delay voltage and providing a control voltage negative in sign, the degree of which increases with signal amplitude. Furthermore, the negative control voltage may be removed from the stage 4 which supplies controlled negative feed-back over the circuits of the output stage or stages 2 and a controllable fraction of the positive control voltage developed in the circuit of the rectifier 6 may be applied thereto. This latter arrangement is especially applicable and is reserved exclusively for the case wherein tetrode or pentode valves are employed in the output stage 2 either singly or in push-pull, and has the special advantage of reducing the harmonic distortion existing in this class of stage to a value below that obtainable with the known arrangement wherein the degree of negative feed-back applied over the output stage remains fixed.

The operation of the arrangement just referred to is such, that as signal amplitude increases, the degree of negative feed-back applied from the output to the input of the preliminary stages 1 over the stage 3 is gradually reduced, whilst simultaneously, the degree of positive feed-back applied across the stages 1 from the said additional stage above referred to, increases, the net result of the diminishing negative feed-back from the stage 3 and the increasing positive feed-back from the said additional stage being to produce a rapid increase of the output of preliminary stages 1 as input signal amplitude increases, the reverse process of course, taking place for a diminishing amplitude of input signal. Simultaneously, the positive control voltage applied to the stage 4 and supplying negative feed-back to the output stage or stages 2, produces a gradual increase in negative feed-back applied over these stages as the degree of expansion effected over the preliminary stages increases with signal amplitude in the manner above described. With this arrangement therefore, a wide maximum range of volume expansion occurs over the preliminary stages 1 through the differential control of positive feed-back applied through the stage 3 and the negative feed-back applied through the said additional stage, whilst any harmonic distortion introduced into the expanded signal by the curvature in the control characteristics of the pentode or tetrode output stages 2 is reduced by the more slowly increasing negative feed-back applied thereacross from the controlled stage 4. Since the rise in gain of the preliminary stage 1 due to the differential control of positive and negative feed-back applied thereacross is more rapid than the fall in gain of the output stage 2 due to the increase in negative feed-back applied through the stage 4, the overall gain of the system increases with signal amplitude, thereby providing an overall expansion effect, the degree of which may be regulated by any of the means above referred to, e. g., by regulating the amplitude of the control voltage applied to the stage 4 from the control rectifiers relative to that applied to the stage 3, and the said additional stage controlling the negative feed-back applied over the preliminary stages 1 and arranged in parallel with the stage 3. A special advantage of the arrangement resides in that only a negligible degree of harmonic distortion is introduced into the expanded signal in its passage through the pentode/tetrode stages on account of the distortion reducing action of the controlled negative feed-back applied thereacross from the stage 4 in the manner above described. In accordance with the principle outlined above, a maximum expansion rate is secured with this arrangement when the delay voltages applied to the controls of the stages 3 and the said additional stage are of equal amplitude or preferably at zero. If desired, a small delay may be applied to the control applied to the stage 4.

Figure 2:
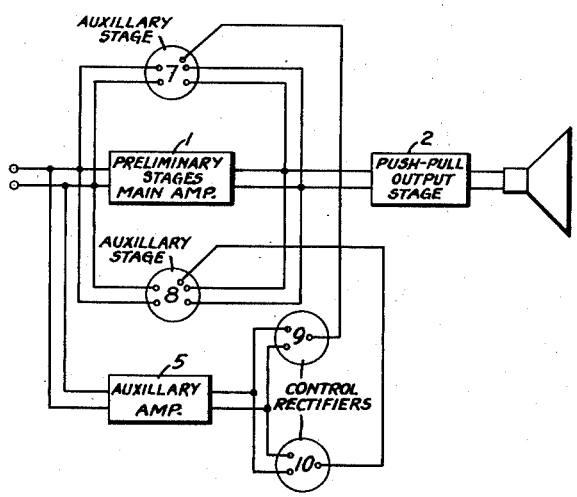
Figure 2 is a further schematic diagram illustrating a further general arrangement in accordance with the invention.

In Fig. 2 is shown diagrammatically a preferred embodiment of the invention. Referring to Fig. 2, the preliminary stages of the main amplifier represented at 1, feed a push-pull power triode output stage represented at 2. An auxiliary valve stage 7 forming a positive or regenerative feed-back path has its input grid coupled to the output of the preliminary stages 1 and its output circuit back-coupled to the input circuit of the stages 1.

Similarly, a further auxiliary valve stage 8 forming a negative feed-back path, has its input grid coupled to the output of the stages 1 and its output circuit to the input circuit of the stages 1. The phase of the voltages fed back through the stage 8 from the output to the input of the stages 1 being such as to supply negative or inverse feed-back thereto. The gain of the positive feed-back stage 7 is controlled by a positive control voltage derived from a control rectifier 9 coupled to the output of an auxiliary amplifier 5 which is similar to the auxiliary amplifier 5 already described with reference to Fig. 1. The gain of the negative feed-back stage 8 is controlled by a negative control voltage derived from a further rectifier 10 also coupled to the output of the auxiliary amplifier 5. Separate and independent delays may be applied to either of the control rectifiers 9 and 10.

The operation of the arrangement of Fig. 2 will be clear from the foregoing and may be effected in several ways. For example, the delay voltage applied to the rectifiers 9 and 10 may be adjusted to zero with the result that, as signal amplitude increases from zero, the negative control voltage applied to the control rectifier 10 to the negative feed-back stage 8 steadily increases producing a steady decline in the initial degree of negative feed-back applied to the preliminary stages 1 (which may be adjusted to any convenient value by adjusting the initial input to the stage 8) whilst simultaneously, a steadily increasing positive control voltage applied to the stage 7 from the rectifier 9 produces a steady increase in the positive feed-back applied over the stages 1. The net result of these two processes is a rapid rise in the gain of the preliminary stages 1 as the amplitude of the input audio signal increases producing a high degree of volume expansion, i. e., a rapid rate of change in the overall gain of the stages 1 with respect to input audio signal amplitude. This may, of course, be regulated as already described with reference to the arrangement of Fig. 1, by adjusting the relative delays applied to the control rectifiers 9 and 10, for example, as already described with reference to the above figure, the delay voltage applied to the rectifier 9 controlling the gain of the positive feed-back stage 7 may be increased to an extent such that the positive feed-back does not commence to increase as input signal amplitude increases until the negative feed-back applied from the stage 8 is almost completely cut off. With this adjustment, the slope of the contrast control characteristic is reduced by approximately 50% over the mode of operation above described whilst the range of input signal amplitude over which a full expansion effect is secured is approximately doubled. With this adjustment therefore, the input signal applied to the stages 1 may be increased to approximately double its former value. Intermediate values of delay again give intermediate shapes to the expansion characteristic enabling a variety of aural effects to be secured.

As a further alternative mode of operation, the negative feed-back applied to the stages 1 over the stage 8 may be increased to bring the initial gain of the former to a medium or low value, the control voltage applied thereto from the rectifier 10 being removed. Full control of the positive feed-back stage 7 from the rectifier 9 is, however, retained. The operation of this arrangement is such that volume expansion is secured solely through variations in positive feed-back and operating in opposition to the preset degree of negative feed-back initially applied to the stages 1 from the now decontrolled stage 8. With this arrangement the rate of expansion may be increased and the shape of the expansion characteristic further adjusted by automatically controlling the gain of the auxiliary amplifier 5 from a positive control voltage derived from a still further control rectifier coupled either to an intermediate point in the stages 1 or the output of these stages or to the output of a further auxiliary amplifier (not shown) and having its input circuit arranged in parallel with that of the amplifier 5, the operation of the arrangement being such, that the gain of the auxiliary amplifier is caused to increase with signal amplitude thereby causing an increase in the expansion rate. For further information as to this method of control, reference is directed to the British Patent No. 518,128 wherein the system is described as applied to automatic gain control systems.

As a still further method of operation and which may be applied to either of the systems described with reference to Figs. 1 or 2, the positive feed-back valve stage (stage 7 in Fig. 2), may be decontrolled by removing the control voltage therefrom and the initial degree of positive feed-back adjusted to bring the stages 1 to a maximum value or to a condition removed from oscillation point by a substantial margin. The initial degree of negative feed-back applied to the stages 1 from the stage 8 is now increased to bring the overall resultant gain thereof to a medium or low value, the automatic control of the stage 8 from the rectifier 10 being retained. With this form of adjustment the resultant degree of positive feed-back applied to the amplifier increases with signal amplitude through the action of the gradually reducing, opposing, initially applied negative feed-back, applied from the controlled stage 8, producing in turn, an increase in the gain of the stages 1, thereby bringing into operation the desired contrast expansion effect. As with the method of operation previously described, the rate of expansion may be adjusted or increased by automatically controlling the gain of the auxiliary amplifier 5 in the manner above referred to.

In addition to the two principal methods of adjusting the expansion characteristic by adjusting the relative values of the delay voltage applied to the control rectifiers and/or automatically controlling the gain of the auxiliary amplifier, described above with reference to the arrangements of Figs. 1 and 2, a still further method of adjustment of the average rate of expansion (i. e., the slope of the expansion characteristic) is possible and applicable to either of these arrangements as well as to all the arrangements to be hereinafter described. According to this method of adjustment, the range or rate of control may be regulated by means regulating the audio input to the auxiliary amplifier 5, e. g., a potentiometer volume control may be provided and/or the initial degree of feed-back applied over the positive and/or negative feed-back paths may be initially adjusted by means of suitable adjustable feed-back attenuating means included in either feed-back path. In a preferred method of adjusting the degree of expansion in operation, the input to the auxiliary amplifier is adjusted simultaneously with the degree of initial negative feed-back applied to the amplifier over the negative feed-back path by means of a ganged control whereby the two adjustments are effected conjointly to enable the average gain of the amplifier to remain substantially unaffected by the degree of expansion in operation. Means for effecting these adjustments are illustrated and described with reference to the circuit arrangements shown in the succeeding figures of the accompanying drawings.

Figure 3:
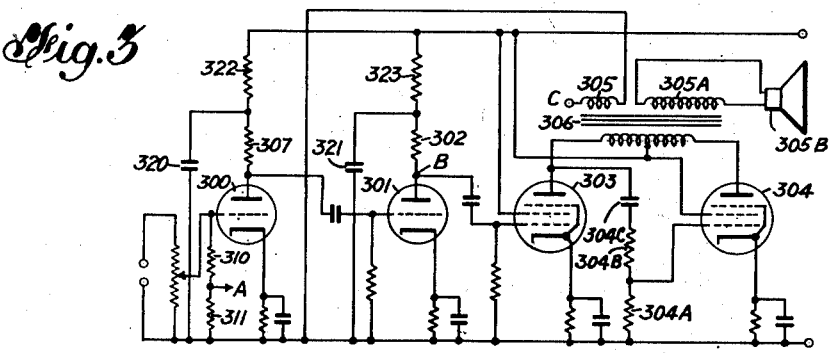
Figure 3 illustrates one possible circuit arrangement of a three stage amplifier of conventional design and to which the invention may be applied.
Figure 4:
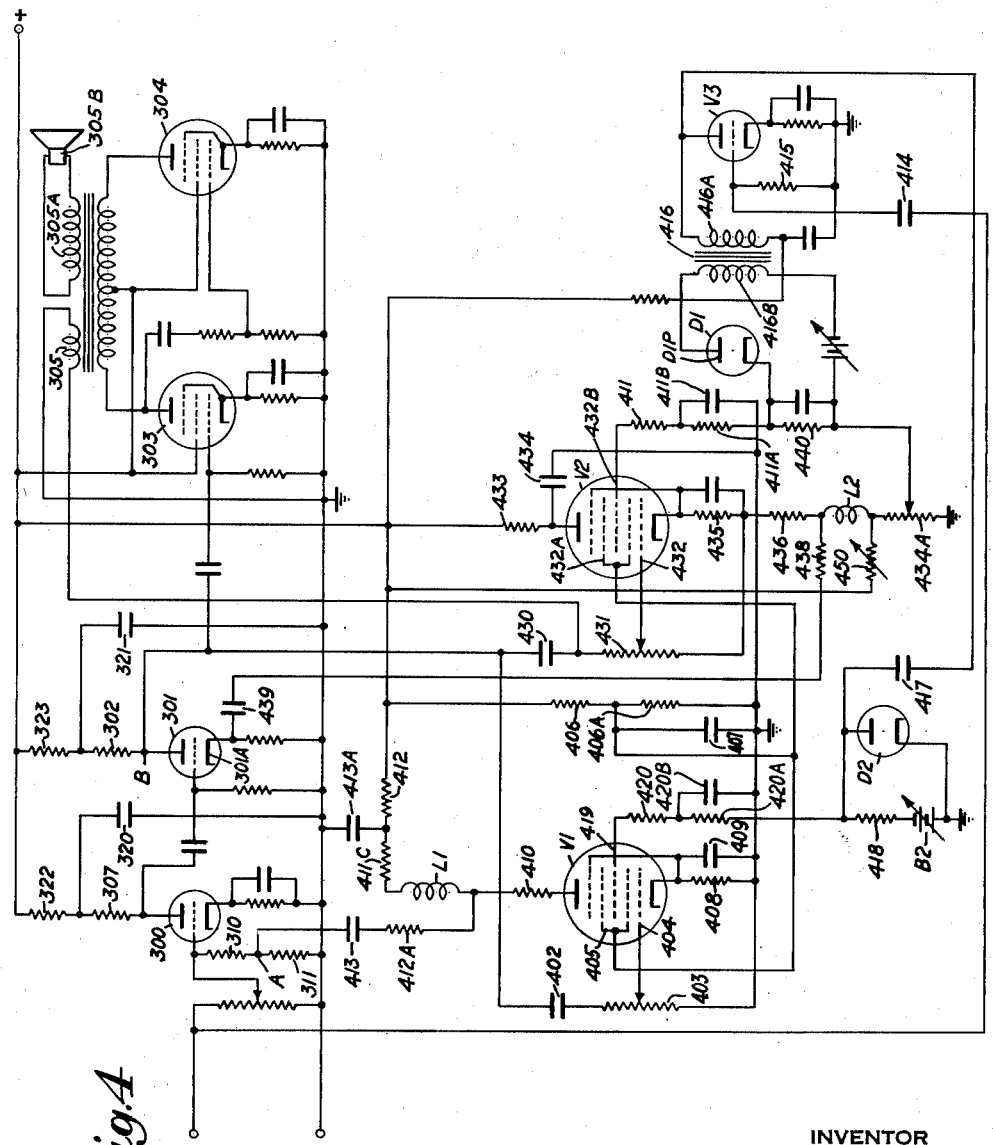
Figure 4 illustrates one possible circuit arrangement of a system embodying the present invention and applicable to the circuit of the conventional amplifier arrangement shown in Fig. 3.

With reference to Fig. 3 of the accompanying drawings, there is shown therein one of many possible forms which the circuits of the main amplifier may conveniently assume and connected accordingly to a circuit arrangement well known per se and which is suitable for operation in conjunction with the circuit arrangements shown in Fig. 4 and which are in accordance with the present invention. Referring to Fig. 3, the preliminary stages of the main amplifier comprise resistance capacity coupled triode stages 300 and 301. The output of the second stage 301 is taken from the anode load resistance 302 and applied to the control grid of the valve 303 forming one of a pair of push-pull pentode output stages 303, and 304. The input grid of the second stage 304 is fed from a voltage attenuating potential divider comprising resistances 304A and 304B serially connected and fed via condenser 304C from the anode of the stage 303 in accordance with the well known system of paraphase resistance-capacity coupled push-pull. If desired, a separate phase reversing stage (not shown) may be employed to supply the phase-reversed input to the stage 304 and such a stage may conveniently comprise a separate resistance capacity coupled triode stage arranged with its input grid energised through a blocking condenser from an attenuating potentiometer connected across the load resistance 302 of the stage 301 the high potential or anode and of the anode resistance of the said phase-reversing stage being coupled over a condenser to the input grid of the pentode 304.

An auxiliary secondary winding 305 is included in the output transformer 306 the high potential end of which is indicated at C. The operation of this auxiliary winding 305 will be described with reference to the arrangements in accordance with the present invention illustrated in Fig. 4.

With further reference to the arrangement of Fig. 3, the first-triode stage 300 is preferably of the medium impedance type i. e., the impedance thereof is in the region of 25,000 ohms or thereabouts, whilst the value of the mutual conductance or slope thereof may be of the order of from 2-3 milliamperes per volt. The second triode stage 301 should be of the medium or low impedance power type, the impedance thereof ranging from anything from 5,000-15,000 ohms whilst the conductance thereof may range from some 3-6 milliamperes per volt. The load resistances 307 and 302 in the anode circuits of these valves should be in the region of 30,000 and 15,000 ohms respectively although considerable latitude is possible and the exact adjustment of values is best determined by experiment. The output pentode stages 303 and 304 should be of the large power class and capable of handling a reasonably large grid swing without overloading, whilst the output transformer 306 should have the correct primary inductance in each half to provide the optimum load for the pentodes 303 and 304, the secondary 305A feeding the voice coil 305B being provided with the correct value of inductance to provide the correct ratio for matching the voice coil impedance to the anodes of the valves 303 and 304, this part of the apparatus however, being designed in accordance with principles well known to the art and forming per se, no part of the present invention.

In Fig. 4 is illustrated one form of the circuit arrangement of valve controlled feed-back circuits which are in accordance with the present invention and particularly applicable to the circuit arrangement of the main amplifier just described with reference to Fig. 3.

In this connection a complete automatic contrast expansion system is formed in conjunction with the circuit of the main amplifier of Fig. 3 by connecting together points marked with the same reference letters A, B, and C, in each figure, the resulting arrangement then being in accordance with the general arrangement shown diagrammatically in Fig. 2. Other systems of connection corresponding with the arrangement of Fig. 1 will be given after the description of the present arrangement.

Referring to Fig. 4, V1 is a hexode positive feed-back controlling valve and corresponds to the stages indicated diagrammatically at "3" in Fig. 1, and 7 in Fig. 2, whilst the negative feed-back controlling valve comprises a further hexode V2 and which corresponds to the additional stage indicated diagrammatically at "4" in Fig. 1 and the stage 8 in Fig. 2. The input to the stage V1 is taken from the point B in the anode circuit of the stage 301 in Fig. 3 over a blocking condenser 402 and feed-back attenuating potentiometer 403 the slider of which is connected to the control grid 404 of the hexode V1. The screen grid 405 of the hexode V1 is supplied with high tension voltage from a potential divider comprising series resistances 406 and 406A of which has connected in parallel therewith a by-pass condenser 407. The control grid 404 has supplied thereto a small operating bias from the cathode resistance 408 by-passed by a condenser 409. The anode circuit of the hexode V1 has included therein the additional feed-back attenuating resistance 410, the phase equalising inductance L1, the resistive anode load 411C and the decoupling resistance 412 operating in conjunction with a decoupling condenser 413. The negative feed-back voltages for application to the point A at the junction of the resistances 310 and 311 included in the grid circuit of the first valve 300 in Fig. 3, are taken from the junction of the resistance 410 and the inductance L1 just referred to and included in the anode circuit of V1 over a feed resistance 412A and blocking condenser 413. The last stage of the auxiliary amplifier for feeding contrast control rectifiers D1 and D2 is represented at V3 the input grid of the stage V3; being fed from the anode circuit of the preceding stage over a condenser 414 and leak resistance 415, the anode circuit thereof including the primary 416A of an audio frequency transformer 416 the secondary 416B of which supplies signal energy to the control diode rectifier D1, the anode D1P of rectifier control diode D2 being fed directly with signal energy from the anode of V3 over a blocking condenser 417. A negative contrast control potential proportional to audio signal amplitude is developed at the anode end of the load resistance 418 of the diode D2, this said control voltage being supplied to the outer control grid 419 of the hexode V1 over a resistance-capacity filter comprised of series resistances 420 and 420A, and having condenser 420B by-passing resistance 420A to ground. An adjustable delay voltage is applied to the diode D2 from a tapping on a bias battery B2.

Turning now to the positive feed-back control valve V2, the audio frequency input to this valve is also derived from the point B over a blocking condenser 430 and feed-back attenuating potentiometer 431 the slider of which is connected to the control grid 432 of the valve V2. The screen grid 432A of the valve V2 is connected to the screen grid 405 of valve V1 and is supplied with high potential as explained above in connection with the screen supply of valve V1. The audio frequency voltage developed at the anode of V2 is developed across a decoupling resistance 433 and by-passed to earth over a condenser 434. The cathode circuit of the valve V2 includes in series the cathode biasing resistance 435, the phase equalising inductance L2, the attenuating resistance 436 and the cathode load resistance 434A across which the positive feed-back voltages are developed and applied over the feed-resistance 43 and blocking condenser 439 to the cathode 301A of valve 301.

A control voltage, positive in sign and proportional to audio signal amplitude, is developed at the cathode end of the load resistance 440 of the diode D1 and applied over a resistance-capacity filter comprised of series resistances 411 and 411A, and having condenser 411B by-passing resistance 411A to ground, to the auxiliary grid 432B of the hexode V2, this grid 412 being initially biassed negatively from the voltage drop across the cathode load resistance 434A, this voltage being supplemented by the additional D. C. voltage developed thereacross by the preset variable resistance 450 connected between the high tension positive line and the junction of the resistance 434A with the inductance L2. The low potential end of the cathode load resistance 440 is connected to the slider on the resistance 434A which is preferably in the form of a potentiometer as shown. Sufficient negative bias voltage to bias the auxiliary grid 432B to cut-off can be secured by sufficiently reducing the resistance 450, thereby increasing the current through the resistance 434 and hence the D. C. voltage drop existing thereacross.

The operation of the system will be now fairly clearly understood from the foregoing. Assuming the points marked A to be connected together (Figs. 3 and 4) and the points marked B (Figs. 3 and 4) the resulting system will be seen to correspond diagrammatically with that already described with reference to Fig. 2 in which the positive feed-back stage V2 in Fig. 4 is represented by the stage 7 (Fig. 2) and the negative feed-back stage V1 (Fig. 4) is represented by the stage 8 (Fig. 2). Since the operation of the arrangement of Fig. 2 has already been dealt with in some detail, for a clear understanding of the arrangement shown in Figs. 3 and 4, it remains only to give a description of the various phases of the audio frequency voltages existing in certain parts of the system to show that positive feed-back occurs from the output to the input of the stages 300 and 301 over the stage V2 and negative feed-back over the stage V1 as well as to give a brief account of the initial operating conditions.

Referring to Fig. 4 it will be understood that the phase of the audio frequency voltages appearing at the point A in the case of the valve V1 are substantially displaced in phase from the input voltage at the point B by substantially 180 degrees, whereas in the case of the valve V2, there exists substantially no phase displacement between the voltages existing between these two points since the audio frequency voltages developed across the cathode load resistance 434 are substantially in the same phase as those existing on the control grid 432. Furthermore, the amplified audio voltages appearing at B, i. e. across the anode load resistance 302 of the second valve stage 301 (Fig. 3), are substantially in the same phase as those existing at A, i. e., in the input circuit of the first stage 300. Hence, assuming the point B in Fig. 4 to be connected to the point marked B in Fig. 3 then it will be clear that the phase of the voltages appearing at the condenser 413 corresponding to the output of V1 are 180 degrees out of phase from the voltages existing on the input grid of the stage 300 with the result that, when the point A corresponding to the output side of the condenser 413 is connected to the point A at the junction of the input resistances 310 and 311 (Fig. 3), the action of the stage V1 is to supply negative or inverse feed-back to the stages 300 and 301, the degree of which is determined firstly by the input to the control grid 404 of valve V1 determined by the setting of the feed-back attenuating potentiometer 403; the conductance of the grid 404 i. e. the effective amplification existing from this grid to the anode of the hexode V1; and the ratio of the output attenuating resistance 410 to the total impedance existing beween the junction of the resistance 410 with the inductance L1 and the junction of the resistance 411 and 412 (since the latter point is effectively at ground potential for audio frequencies through the action of the decoupling condenser 413A). In practice, the resistance 410 is chosen of such value relative to the resistance 411 that 100% negative feed-back exists over the stages 300 and 301 with the valve V2 at maximum conductance (i. e. approximately zero bias applied to the auxiliary grid 419) and the input potentiometer 403 at approximately 75% of the maximum setting. This feed-back attenuating potentiometer 403 may then be adjusted to any intermediate value to bring the initial gain of the stages 300 and 301 to a suitable operating value in the absence of a signal, which operating value may range from 50% of the maximum gain of these stages to as little as 5% of this value depending on the mode of operation to be employed, as detailed in the foregoing description relating to the different modes of operation possible with the systems of Figs. 1 and 2. Similarly, it will be seen that since the output voltages appearing at the output of the stage V2 i. e. at the output side of the condenser 439, are substantially in the same phase as that of the input voltages existing on the control grid 432 that these voltages are substantially in the same phase as those existing in the circuit of the first amplifier stage 301 i. e. at the junction of the resistance 310 and 311 and therefore the stage V2 serves to supply positive feed-back or regeneration to the stages 300 and 301. Initially, that is to say, in the absence of an input signal, the potentiometer 434 and resistance 450 are adjusted to supply sufficient negative bias to the auxiliary grid 432B of V2 to produce complete cut-off of anode current, that is to say, the valve V2 is at zero conductance with the result that the positive feed-back applied over the stages 300 and 301 is substantially reduced to zero. Adjustment of the positive feed-back attenuating potentiometer 434A is carried out with the valve V2 operating at maximum conductance that is to say, with the slider of the potentiometer 434 at the upper (cathode end of its travel) corresponding to only a small negative bias on the auxiliary grid 432B, and this is adjusted to bring the stages 300 and 301 to as close to oscillation point as may be desired. In practice, a gain increase of over 100 times is realisable, whilst the system still remains at a considerable distance from self-oscillation, and this can be effected with the potentiometer some 25% from its maximum setting by suitable choice of the value of the output attenuating resistance 436 relative to the combined impedance presented by the inductance L2 in series with the load resistance 434. The values of the inductances L1 and L2 are best determined by experiment in different cases but in general are of just sufficient value to produce neutralisation of the effect of the stray capacities at the upper audio frequencies in the region of 10,000 cycles or thereabouts thereby preventing substantial phase shift of either feed-back voltages in the region of the upper audio frequencies. This ensures that the positive and negative feed-back produces a uniform lift and depression of gain respectively throughout the useful spectrum of audio frequencies, and avoids the effect of "singing" which otherwise readily occurs with audio frequency feed-back circuits and due to spurious oscillation produced through phase shift of the negative feed-back voltages towards the higher audio frequencies.

In the operation of the system of Fig. 4 the feed-back attenuating potentiometers 403 and 431 may be set in accordance with the foregoing remarks whilst the bias potentiometer 434 may be adjusted to produce cut-off of the screen grid 432A in the absence of a signal thereby reducing the positive feed-back to zero. The feed-back attenuating potentiometer 403 may be adjusted as indicated above to lower the initial gain of the system to a suitable value, depending on the degree of gain required in the stages 301 and 302 in the absence of a signal. Imagining now a steadily increasing audio signal applied to the input of the stage 300, then a steadily increasing audio voltage appears at the output of the last auxiliary amplifier stage V3 producing a steadily increasing positive control voltage across the load resistance 440 of the diode D1 and which is applied to the auxiliary grid 432B of the valve V2, thereby producing a steady increase in gain of this stage and hence a steady increase in the degree of positive feed-back or regeneration over the stages 300 and 301. Simultaneously, a steadily increasing negative control voltage is developed across the load resistance 418 of the diode D2 and which is applied to the auxiliary grid 419 of the hexode V1 thereby producing a steady reduction in gain of this stage and hence a steady reduction in the degree of negative feedback applied over the stages 300 and 301. The combined action of the steady reduction of negative feed-back occurring over the stage V1 and the steadily increasing degree of positive feedback over the stage V2 produces a fairly rapid, effective increase in the gain of the stages 300 and 301. Similarly, a decrease in input signal amplitude produces the opposite result and a steady diminution of the gain of the stages 300 and 301 occurs. The gain variations are therefore seen to be in the same sense as the variations in input signal amplitude and hence produce the effect of expansion of the signal under amplification by the stages 300 and 301, the expanded signal being fed into the grid circuit of the push pull output stages 303 and 304. In the foregoing discussion the delay voltages applied to the control rectifiers D1 and D2 have been assumed to be at zero. By supplying different values of delay voltage to the rectifiers from the batteries B1 and B2, the effects already fully described above with reference to Figs. 1 and 2, can be secured. Since a full description of these effects has already been given with reference to the above figures, no further reference thereto is deemed necessary for a full understanding of the invention.

No reference has as yet, been made to the means adopted with the arrangement of Fig. 3 for reducing the curvature or harmonic distortion occurring in the output pentode stages 303 and 304. This may be offset in either of two ways, as enumerated in the description with reference to the arrangement of Fig. 1. In the first place, either a fixed degree of negative or inverse feedback may be supplied from the output to the input circuits of the push-pull stages 303 and 304. In the arrangement of Fig. 3, this may be readily effected by including the auxiliary secondary winding 305 provided in the output transformer 306 in series with the cathode circuit of the penultimate stage 301 in which case the sense of the winding 305 in relation to the transformer primary must be correctly arranged to produce negative feed-back, the proper sensing of winding 305 can be ensured by the simple trial and error method of reversing the winding, one direction giving positive feed-back and the other negative feed-back. Alternatively and preferably, the arrangement shown and described with reference to Fig. 1, may be incorporated and a separate valve controlled stage of inverse feedback is included from the output to the input circuits of the pentode output stages 303 and 304, the degree of inverse feed-back being arranged to increase slowly with the degree of expansion effected in the preceding stages 300 and 301 by the means above-described. This additional negative feed-back controlling stage may be similar to the stage V2 in Fig. 4 except that the input and output electrodes of this stage are now connected to supply negative feed-back to the stages 303 and 304 instead of positive feed-back over the stages 300 and 301. The latter function is however preferably retained by the inclusion of stage V2 over the preliminary stages 300 and 301 and supplying automatically controlled positive feedback thereto in the manner above described in addition to the further such stage now included over the output stage. The connections necessary to enable a stage similar to V2 to perform the latter function may be readily effected by connecting the input attenuating potentiometer (similar to 431, Fig. 4) in parallel with the winding 305 (Fig. 3), and feeding the output of the stage either to the point B (Fig. 3), or to the cathode of the penultimate stage 301 the bypass condenser connected across the cathode resistor thereof being in this case removed. The sense of the feed-back can be adjusted as in the case just described by reversing the sense of the winding 305, until the correct sense for inverse feed-back is secured. It should be noted however, that with this arrangement only a fraction of the positive control voltage is developed in the load resistance 440 of the control rectifier D1. Fig. 4 should be applied to the auxiliary grid 432B of the additional stage V2 and this may be provided for by deriving the control voltage from a tapping on the load resistance similar to 440 (Fig. 4). It may be remarked, that for the correct operation of the circuits above described with reference to Figs. 3 and 4, the decoupling provided in the anode circuits of the stages 300 and 301 must be thorough to prevent any possibility of unwanted low frequency instability setting in (frequently referred to as motor-boating) over the circuits of the preliminary stages. Unwanted feed-back over the high tension circuit from the output circuit is, in this case, prevented by the adoption of a push-pull connection whereby any residual output energy from one output valve and developed across any residual audio frequency impedance present in the H-T line is cancelled or neutralised by the oppositely phased residual energy fed into this circuit from the other. On account of their stabilising properties in this respect, as well as their capacity to handle large input grid swings with low distortion and particularly the cancellation of second harmonic distortion, push-pull stages are specified as exclusively the most suitable class of stage for use with the automatic contrast expansion systems in accordance with the present invention. Decoupling of the preliminary stages 300 and 301 can be made thorough by arranging for the decoupling condensers 320 and 321 to be of large capacity, for example, electrolytic condensers of 8 mfds. capacity are suitable for employment in this position whilst the decoupling resistances 322 and 323 should be at least of the order of 20,000 ohms in value.

As an additional precaution, an electrolytic condenser (not shown) of some 16 mfds. capacity may advantageously be connected across the high tension positive line and ground.

Figure 5:
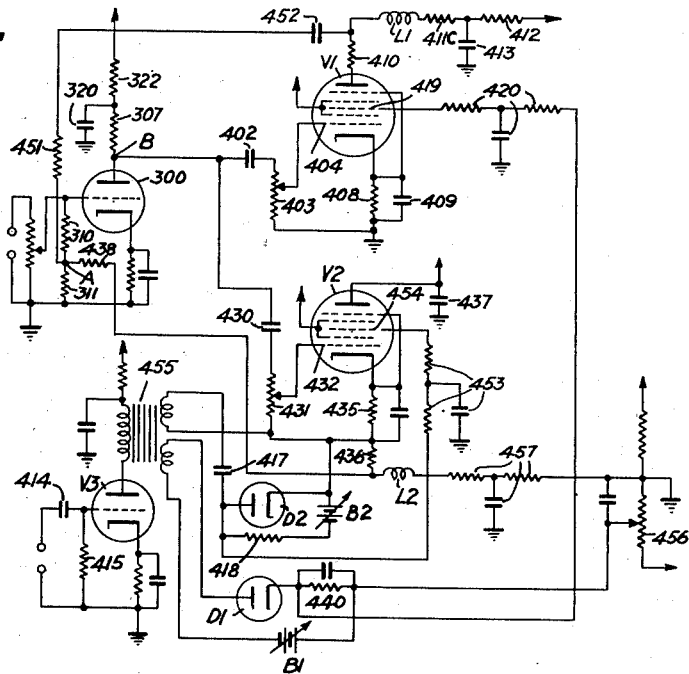
Fig. 5 illustrates a further circuit arrangement embodying the invention in which differential valve controlled positive and negative feed-back is applied over a single amplifier stage.

In Fig. 5 is shown a further circuit arrangement embodying the invention in which differentially controlled positive and negative feed-back is applied from feed-back controlling valves V1 and V2 over a single amplifier stage 300. This arrangement may advantageously be employed in cases wherein it is convenient to include only one stage of audio frequency amplification between the detector and output stages, as for example, frequently occurs in a superheterodyne receiver employing high-level second detection as for example, full-wave diode rectification and wherein a minimum degree of audio frequency amplification is required between this second detection stage and the output stage. In this case the stage 300 may conveniently be of the large power triode class. The operation of the remainder of the circuit is substantially similar to that already described with reference to the foregoing Figures 3 and 4 and further reference thereto is therefore deemed unnecessary.

Figure 6:
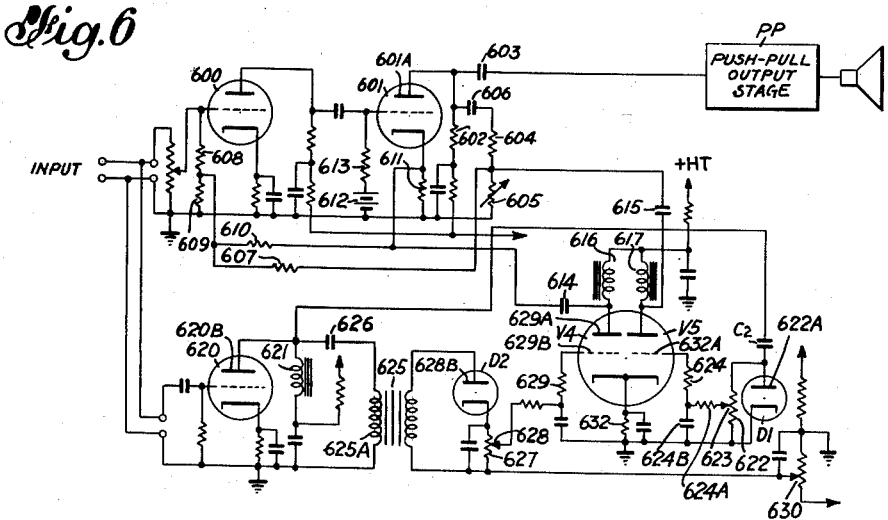
Fig. 6 illustrates a still further circuit arrangement embodying the invention wherein differential valve controlled feed-back is applied over two cascaded amplifier stages.
Figure 1:
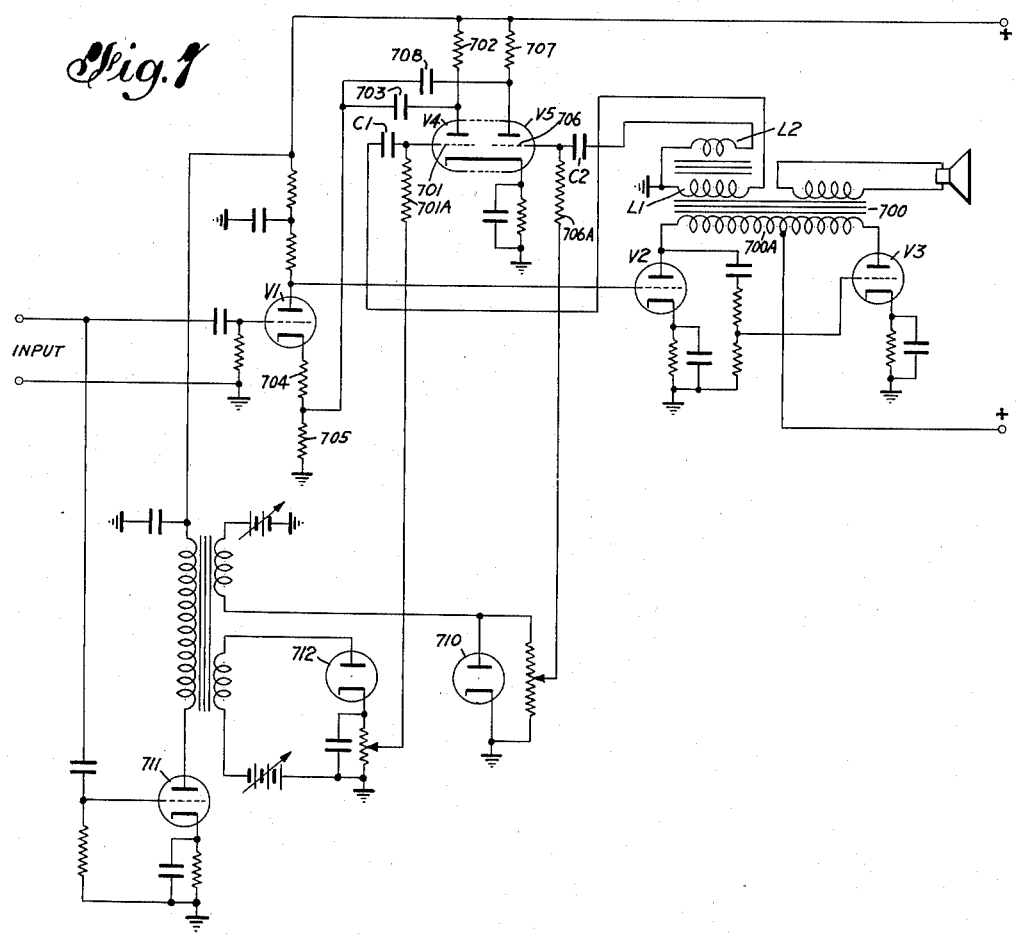

In Fig. 6 is shown a still further embodiment of the invention wherein a different arrangement is employed for automatically controlling the relative degrees of positive and negative feed-back applied to the system, and which avoids the necessity of the voltages fed back being subjected to additional amplification by the feed-back controlling valves per se, this tending to somewhat simplify the system both as regards the complexity of the circuit arrangement and valves necessary as well as the initial adjustments necessary, to secure the correct operation of the system.

Referring to Fig. 6 the preliminary stages of the main amplifier over which controlled feed-back is applied comprises resistance capacity coupled triode stages 600 and 601. The output audio frequency voltages of the amplifier are developed across the anode load resistance 602 of the second stage 601 and applied to a succeeding push-pull output stage PP (shown) in block form over a coupling condenser 603. A resistance potential divider comprising resistances 604 and 605 is connected between the anode 601A of the valve 601 and earth through a blocking condenser 606. The junction of the resistances 604 and 605 is connected over a feed-back resistance 607 to the junction of further resistances 608 and 609 connected in series across the input grid circuit of the first stage 600. A further circuit connects the cathode end of the cathode resistance 611 of the stage 601 over a resistance 610 to the junction of the resistances 608 and 609. From the nature of these connections it will be clear that the circuit including the resistance 607, supplies positive feed-back or regeneration from the output of the stage 601 to the input of the stage 600, whereas; the circuit including the resistance 610 supplies negative or inverse feed-back from the output of the stage 601 to the input of the stage 600. By suitable choice of the relative values of the resistances 604 and 605, the initial degree of positive feed-back applied over the resistance 607 from the output of the stage 601 to the input of the stage 600 may be arranged to be equal to or slightly less than the degree of negative feed-back applied to the input of the stage 600 from the cathode resistance 611 of the stage 601 over the resistance 610. Thus, with the latter adjustment, there can be provided any desired initial preponderance of negative feed-back over the positive feed-back applied from the output of the stage 601 to the input of the stage 600, whereby the initial gain of the stages may be depressed to any desired extent. The values of the resistances 605 and 611 for securing any of these adjustments may be arranged to be approximately equal and may vary in value from 1000 to 10,000 ohms. Any excessive bias applied to the control grid of the valve 601 by the use of a high value of cathode resistance, for example, 5000 ohms, may be offset by a bias battery 612 included in series with the grid resistance 613 in the grid circuit of the valve 601 and arranged to supply positive bias voltage to the control grid thereof to a sufficient extent to offset the excess negative bias voltage applied thereto from the cathode resistance 611. The anode-cathode paths of a pair of feed-back controlling valves V4 and V5 are respectively connected in parallel with the cathode resistance 611 and the resistance 605 forms the lower arm of the potential divider formed by resistances 604 and 605 in series through respective blocking condensers 614 and 615. The anode circuits of the valves V4 and V5 are completed respectively through low frequency chokes 616 and 617 connected between the anodes 629A and 629B of these valves respectively and the high tension positive line H. T. The last stage 620, of an auxiliary amplifier having its input circuit arranged in parallel with the input circuit of the valve 600, has included in its anode circuit, a low frequency choke 621, the amplified audio voltages developed thereacross being shunt fed over a condenser C2 to the anode 622A of a diode control voltage producing rectifier D1 across the load resistance 622 of which is developed a negative control voltage proportional to the amplitude of the applied input audio signal. An adjustable fraction of this control voltage is applied from the slider 623 of the load resistance 622 which is in the form of a potentiometer and applied over a resistance-capacity filter comprised of series-connected resistances 624 and 624A, and having condenser 624B by-passing resistance 624A to ground. Resistance 624 is connected to the control 632A of the feed-back controlling valve V5. Similarly, the anode circuit of the valve 620 feeds audio signal energy to the anode 628B of a diode D2 over a transformer 625 the primary of which 625A is shunt fed from the anode 620B of the valve 620 over a condenser 626. A positive control voltage is developed at the cathode end of the cathode load resistance 627 of the diode D2 and applied from an adjustable tapping 628 on the load resistance 627 to the control grid 629B of the feed-back controlling valve stage V4. The control grid 629B of V4 is initially biased negatively to a point approaching cut-off from a potential divider 630, so that in the absence of a signal the anode-cathode impedance of V4 is at a maximum value. Under the same conditions, that is to say, in the absence of a signal, the bias of the other stage V5 is at a minimum and corresponds with the normal operating bias of the valve derived from the cathode bias resistance 632, so that the anode-cathode impedance of this stage is at a minimum. The valves V4 and V5 should be of the low impedance or power class, in order that the minimum impedance of the valves at minimum bias, should be of the order of a few thousand ohms, so that the impedance of the stage V3 V5 in the absence of a signal, is of this order. As above indicated, the initial degree of positive feed-back applied to the valves 600 and 601, that is to say, the extent of this feed-back obtaining in the absence of a signal, should be adjusted by suitable choice of the relative values of the resistances 604 and 605 to be equal to or preferably slightly greater than the degree of negative feed-back. In the case wherein the former condition obtains, that is to say, the degree of positive feed-back equals the degree of negative feed-back, then the two kinds of feed-back neutralise each other and the amplifier behaves substantially as an amplifier without feed-back; whereas, in the case wherein the latter condition obtains, there exists a preponderance of negative feed-back. This adjustment should be carried out without the anode-cathode impedances of the valves V4 and V5 being in shunt with the circuits, that is to say, with the condenser 614 disconnected from the junction of the resistances 610 and 611 and the condenser 615 disconnected from the junction of the resistances 604 and 605. Assuming now the anode-cathode impedances of these valves to be connected in circuit by completing the connections just referred to, then with the initial operating conditions obtaining above referred to the impedance of the valve V4 controlling the negative feed-back is at a maximum value whereas the impedance of the valve V5 is at a minimum. In the former case above referred to therefore, wherein the initial degree of positive feed-back is arranged to be equal to or balance the degree of negative feed-back with the valves V4 and V5 disconnected, then with these valves connected in circuit in the manner above indicated the shunt impedance due to the parallel connection of valve V4 with the negative feed-back producing resistance 611 considerably exceeds that due to V5 and in parallel with the positive feed-back producing resistance 605, with the result that the degree of negative feed-back applied over the stages 600 and 601 considerably exceeds the degree of positive feed-back, this condition of course, obtaining in the absence of a signal. The degree of this preponderance of the initial negative feed-back over the positive feed-back may be adjusted to any desired extent by suitable adjustment of the value of the resistance 605 relative to the value of the resistance 604 whereby the initial gain of the stages 600 and 601 may be depressed to any desired extent. Imagining now, a signal of increasing amplitude to be applied to the input of the amplifier, it will be seen that due to the resulting increasing negative automatic control bias applied to the grid of the valve V5 from the rectifier D1 and the increasing positive control bias applied to the grid of the valve V4 from the rectifier D2, due in either case, to the rectification by the rectifiers D1 and D2 of the increasing input signal, that the anode-cathode impedance of the valve V5 increases whereas the anode-cathode impedance of the valve V4 falls, producing a reduction in the impedance in parallel with the negative feed-back producing resistance 611 and increase in the impedance in parallel with the positive feed-back producing resistance 605, with the result that the degree of negative feed-back applied to the stages 600 and 601 decreases simultaneously the degree of positive feed-back applied thereto increases, the combined effect of which is to produce a fairly rapid increase in the gain of the stages 600 and 601. Since this result is obtained automatically as the result of the increasing amplitude of the applied input signal, it will be seen that the circuit fulfills the essential requirements of an automatic volume expansion system, and that this result is secured through the automatic differential control of positive and negative feed-back. The degree of expansion in operation with the arrangement just described may be adjusted by regulating the amplitude of the control voltage applied to the control grids 629B and 632A of the valves V4 and V3 V5, respectively, by adjusting simultaneously the sliders 628 and 623 of potentiometers 627 and 622, respectively, and for this purpose, these controls should preferably be ganged together. The same result may be secured as described with reference to the former arrangements by regulating the audio input to the auxiliary amplifier. With either method of adjustment, as the degree of expansion in operation is reduced with an input audio signal applied, there is produced a fall in the average gain of the amplifier and vice-versa, and to offset this, the resistance 605 controlling the degree of positive feed-back in circuit is preferably simultaneously adjusted to compensate for this change of average gain. To effect this, the resistance 605 should be arranged to increase as the degree of expansion is reduced by reducing the settings of the potentiometer sliders 628 and 623 or by reducing the input to the auxiliary amplifier and this result may of course, be secured in the most convenient manner by ganging these controls together. The same result may be achieved by regulating the value of the resistance 611 but in opposite sense to that of the resistance 605, that is to say, the resistance 611 should be arranged to decrease as the expansion control above referred to, regulating the degree of expansion in operation, is reduced, and vice-versa.

The arrangement just described with reference to Fig. 6 has the advantages over the preceding ones firstly, of greater simplicity in the general circuit arrangement, and secondly, of avoiding actual amplification of the feed-back voltages by the controlling valves, which in turn has the advantage that the use of the more complex hexode valves described with reference to the preceding arrangements can be avoided. In addition, any slight distortion of the feed-back voltages which might be incurred through the process of amplification in their passage through the feed-back controlling valve is now completely avoided. It should be stated however, that in the foregoing arrangements, this distortion is negligibly small, firstly, because the amplitude of the feed-back voltages applied to the control grids of the hexodes is held at an extremely small value by the initial adjustment of the feed-back attenuating potentiometers provided and secondly since the automatic contrast control voltage is applied to auxiliary grids other than that to which the input voltages are applied which serves to ensure that the control grid volts-anode current of operating characteristic remains substantially linear at all values of gain that is to say, at all values of input signal. The arrangement of Fig. 6 has however, the advantage that one less amplifying stage is included in the chain of feed-back in consequence of which the rate of change of phase of the feed-back voltages with respect to frequency in evidence at the upper audio frequencies is sufficiently reduced to substantially avoid the necessity of the additional complication of the phase equalising inductances necessary with the preceding arrangements which involve the use of three amplifying stages in the feed-back loop.

As an additional refinement to the arrangement of Fig. 6, it is possible by means of a simple modification to arrange for automatic variation of the frequency response of the amplifier with signal amplitude according to the principles laid down above and such an arrangement will be shown and described with reference to Figs. 8, 9, 11 and 12.

As an alternative to arranging the automatic differential control of feed-back over stages penultimate to the output stage, it is possible, in cases wherein only one stage of audio frequency amplification is required penultimate to the output stage, to arrange for the positive and negative feed-back to be introduced from the output circuit of the output stage to the input circuit of the penultimate stage and an arrangement of this kind is illustrated in the circuit shown in Fig. 7. This arrangement is more suited to the handling of a large amplitude of input signal than the preceding arrangements and is, moreover, capable of delivering an exceptionally large, expanded output free from distortion.

Referring to Fig. 7, the preliminary audio frequency amplifying stage preceding the output stage comprises a single triode amplifier V1 which is preferably of the small power type. This stage is resistance capacity coupled to a pair of super-power triodes V2 and V3 in resistance-capacity coupled paraphase push-pull. This part of the circuit is in accordance with principles already known per se to those skilled in the art, and will not therefore be further referred to. Referring now exclusively to those parts of the circuit which are in accordance with the present invention: positive and negative feed-back voltages are initially derived from either end of an auxiliary centre-tapped secondary winding comprising two halves L1, L2, included in the main push-pull output transformer 700. The windings L1 and L2 are of only small inductance and need not include more than 10-20 turns each. As will be understood, the audio frequency voltages appearing at opposite ends of the winding L1, L2 that is to say, the voltages appearing at the high potential ends of L1 and L2 respectively are in reverse phase to each other, or in other words, mutually displaced in phase by 180 degrees. The audio frequency voltages appearing at the high potential end of L1 are applied over a condenser C1 to the control grid 701 of a feed-back controlling valve stage V4, to which is also applied a positive automatic contrast control voltage over a grid resistance 701A.

Amplified audio frequency voltages are developed across the anode load resistance 702 of valve V4 and fed over a blocking condenser 703 to the junction of two resistances 704 and 705 included in series in the cathode circuit of V1. The sense of the winding L1 relative to the primary 700A of the output transformer 700 is arranged such that the audio frequency voltages fed-back over the circuit just described, namely, C1, grid 701 of valve V4, 703 and 704, 705, supply positive feed-back or regeneration from the output of the stages V2 and V3 to the input circuit of V1 via the cathode resistance 705. The high potential end of the oppositely phased winding L2 of output transformer 700 is coupled over a condenser C2 to the control grid 706 of a second feed-back controlling valve V5 (which may be included in the same evacuated envelope as V4 as illustrated), to which is also applied a negative contrast control voltage over grid resistance 706A and derived from a rectifier 710 coupled to the output of an auxiliary amplifier 711 similar to the arrangements shown and described with reference to the preceding figures, particularly D2 in Fig. 5 the same also applying to the positive control voltage referred to above over the grid resistance 701A derived from a rectifier 712 coupled to the output of auxiliary amplifier 711 similar to the showing in the preceding figures, particularly D1 in Fig. 5. Amplified audio frequency voltages are developed across the anode load resistance 707 of the stage V5 and fed over a blocking condenser 708 to the junction of the resistances 704 and 705 included in series in the cathode circuit of V1. Since the voltages applied to the control grid of V5 are derived from the high potential end of the winding L2 it will be understood from the foregoing that the phase thereof is displaced by 180 degrees from that of the voltages on the grid of V4 derived from the high potential end of L1, and hence the phase of the voltages fed into the cathode circuit of V1 from the diode of V5 are displaced by 180 degrees from the voltages fed into this circuit from V4. Since the phase of the latter voltages has been arranged by adjustment of the sense of the winding of L1 relative to the primary of the transformer 700 to supply positive feed-back or regeneration to the system, it will be understood that the phase of the voltages fed into the cathode circuit of V1 from the anode of V5 is such as to supply negative feed-back or degeneration to the system. The initial adjustment of the system is such that with the feed-back controlling valves V4 and V5 operating at equal gain, that is to say, with equal bias voltages applied to the control grids thereof (the valves being arranged of identical characteristics) the degree of negative feed-back from V5 exactly annuls the positive feed-back from V4 with the result that the amplifier behaves substantially as an amplifier without feed-back. Initially however (that is to say, in the absence of a signal) the valve V4 supplying positive feedback is biassed to cut-off whereas the valve V5 is at minimum bias or maximum gain. The net result of this adjustment is that in the absence of a signal, a considerable degree of negative feed-back is applied over the circuits of the amplifier from the valve V5; the degree of which may be adjusted by adjusting the value of the resistance 705 relative to the value of the resistance 704 or by conecting a resistance of adjustable value between the condenser 708 and the junction of the resistances 704 and 705; to bring the gain of the amplifier to a medium or low value. The operation of the system will now be readily understood from the examples of the invention previously given with reference to the preceding figures in that with an increasing input signal applied to the input of the amplifier, the increasing positive control voltage applied to the grid of V4 coupled with the increasing value of negative, (such bias applied to the grid of V5) produces a steady increase in the degree of positive feed-back coupled with a steady decrease in the degree of negative feed-back, producing in turn a fairly rapid rise in the gain of the amplifier and vice-versa for a diminishing input signal. The arrangement therefore acts as a contrast expansion system the degree of expansion in operation being adjustable by any of the means above described with reference to preceding figures. It should be noted that with the arrangement just described, that for substantially distortionless operation to be secured, the control grids of the valves V4 and V5 should be specially wound to provide them with "variable-mu" characteristics so that amplitude distortion of the feed-back voltages which would otherwise occur at high values of bias voltage and produced through curvature at the bottom-bend of the control characteristic, is substantially avoided. Alternatively and preferably, the valves V4 and V5 are hexodes as described with reference to the arrangements of Figs. 4 and 5, and the control voltages are applied to the auxiliary grids thereof in the manner already described with reference to these arrangements, triodes only being shown in the arrangement of Fig. 7 to avoid unnecessary complication. For the same reason, and in order to facilitate the description of the fundamental operation of the circuit arrangements in accordance with the present invention shown in Figs. 4 and 5, the necessary high-pass filters for the automatic regulation of the tonal or frequency response with signal amplitude were omitted from these arrangements. Accordingly, a further embodiment of the invention similar to that already shown and described with reference to Figs. 3 and 4, but including the latter refinement, is shown in Fig. 8.

Referring to Fig. 8, differentially controlled positive and negative feed-back is applied from the output to the input circuits of two cascaded resistance, capacity coupled amplifier valve stages comprising triodes 100 and 101, the general circuit arrangement of which will be understood from the description of the foregoing arrangements. Referring now to those parts of the circuit which are exclusively in accordance with the invention, the output voltages developed across the resistive load impedance 101A of the second stage 101 are fed into the input circuit of a push-pull triode or pentode output stage (not shown), and substantially as already described with reference to any of the foregoing arrangements over a coupling condenser 180. The output of the stage 101 is also applied over blocking condensers 116 and 108 to feed-back attenuating potentiometers 117 and 109, the sliders of which are directly connected to the control grids 102A and 103A, of feed-back controlling valves 102 and 103 respectively, of which the former valve 102 supplies positive feed-back and the latter valve 103 supplies negative feed-back from the output to the input circuits of the amplifier stages 100 and 101. The connections of the positive feed-back circuit from the anode of the stage 102 comprise a circuit including a tuned audio frequency rejector network comprising an inductance 150, capacity 152, resistances 151 and 153, all in parallel relation and blocking condenser 110 connected between the junction of an attenuating anode resistance 111 and phase equalising inductance 112 arranged in series with the main resistive anode load 113 of the stage 102 and the cathode 100A of the first amplifier stage 100. Arranged in series in the cathode circuit of the stage 100 are the cathode load and biasing resistances 114 and 115 respectively, across which the positive feed-back voltages are developed and thereby effectively applied to the control grid 100B of the stage 100. That the phase of the voltages fed back to the input circuit of the stage 100 over this circuit is correct for supplying positive feed-back to the system will be understood from the following brief analysis of the phase relationships of the audio frequency voltages existing in the various parts of the circuit. Thus it will be understood, that the phase of the audio frequency voltages appearing in the anode circuit of the stage 101 is substantially the same as the phase of the input audio frequency voltages existing in the grid circuit of the stage 100, since in the process of amplification in the stages 100 and 101, these voltages undergo a double phase reversal, this process being in accordance with principles well known per se. Furthermore, it will be understood that the phase of these voltages undergoes substantially a still further reversal in the process of amplification by the positive feed-back controlling stage 102, that is to say, the phase of the voltages appearing across the anode load impedance comprising the phase equalising inductance 112 in series with the load resistance 113 of the stage 102, is substantially displaced by 180 degrees from those existing on the control grid 102A thereof and derived from the anode circuit of the stage 101 over the condenser 108 and attenuating potentiometer 109. In consequence, the phase of the voltages applied to the cathode circuit 100A of the stage 100 from the anode circuit of the stage 102 over the network above described, is substantially displaced by 180 degrees from the phase of the audio voltages existing in the input grid circuit of the stage 100, and hence the phase of the voltages communicated to the grid input circuit of this stage is substantially identical with that of the input audio frequency voltages existing therein, since as will be understood, the fed back voltages undergo a still further phase reversal in their passage to the control grid circuit through being applied to the cathode of the stage 100 instead of directly to the control grid circuit. The phase of the voltages fed back to the control grid circuit of the stage 100 over the circuit above described being therefore substantially identical with that of the input voltages, those already existing in this circuit, it will be understood that the conditions correspond to those providing positive feed-back or regeneration to the stages 100 and 101.

Turning now to the connections of the negative feed-back circuit, these are similar to those already described with reference to the above circuit except that one less stage of phase reversal is introduced into the voltages fed back which supplies the necessary conditions for negative feedback. Referring again to Figure 8, the negative feed-back circuit comprises an attenuating potentiometer 117 fed from the anode circuit of the stage 101 over a blocking condenser 116, the slider of the potentiometer 117 being directly connected to the inner control grid 103A of the negative feed-back controlling valve 103, the anode circuit of which includes in series, the attenuating resistance 118, the phase equalising inductance 120, and the resistive load impedance 119. Decoupling circuits are included in the anode circuits of the stages 102 and 103 in a manner well known per se, reference to these parts of the circuit being therefore omitted. The negative feed-back circuit includes in series, a blocking condenser 181, tuned rejector circuit comprising inductance 160, capacity 162 and resistance 161, all in parallel relation arranged in series with the feed resistance 182. As shown, the condenser 181 is connected directly to the junction of the resistance 118 and equalising inductance 120, the other end of the feed-back circuit just described being completed by a direct connection from the resistance 182 to the control grid 100B of the stage 100. Since the voltages fed back to the input grid 100B of the stage 100 traverse a similar circuit to that above described with reference to the positive feed-back circuit except that these voltages are applied to the control grid 100B of the stage 100 instead of the cathode 100A thereof, it will be understood that this circuit involves one less phase reversal than that involved in the latter circuit in consequence of which, the phase of the voltages reaching the control grid 100B of the stage 100 over the resistance 182, is substantially displaced by 180 degrees from that of the input voltages existing thereon, so that the conditions correspond to those for supplying negative feed-back to the stages 100 and 101, the degree of which may be automatically controlled by controlling the conductance of the negative feed-back controlling valve 103. As shown in the figure this is effected by supplying to the auxiliary grid 103B of the valve 103 a negative contrast voltage derived from the load resistance 183 of the diode control rectifier 134 over a resistance 140 and filter comprised of series-connected resistances 144A and 144B shunted to ground at their junction point by condenser 144C. The contrast control rectifier 134 is supplied with audio signal energy from the anode 130A of the last stage 130 of an auxiliary amplifier (similar to that already described with reference to the preceding arrangements for producing a contrast control voltage) over a condenser 132. The low frequency choke 131 is serially disposed between positive potential and the anode 130A of valve 130 to afford impedance coupling of valves 130 and 134. As with the foregoing arrangements, an adjustable delay voltage may be applied to the diode 134 from a battery 184. Similarly, the conductance of the positive feed-back control valve 102 is automatically controlled in accordance with a positive contrast control voltage derived from the cathode load resistance 137 of the diode 135 over a series resistance 185 and filter comprised of series resistances 143 and 143A shunted to ground at their junction point by condenser 143B, and applied to the auxiliary grid 102B of the positive feed-back controlling valve 102, which in the absence of a signal, is initially biased negatively to the region of cut-off from the potentiometer 192 which, with series resistance 193, comprises a potential divider. The choke 187 is serially disposed between the anode 135A of the diode 135 and the cursor of potentiometer 192, and the anode 135A being supplied with audio signal energy from the last stage 130 of the auxiliary amplifier over the condenser 186. An adjustable delay voltage may be applied to the diode 135 from the battery 188.

In operation, the negative feed-back attenuating potentiometer 117 is initially adjusted to depress the gain of the stages 100 and 101 to a medium or low value in the absence of a signal, whereas the positive feed-back attenuating potentiometer 109 is adjusted to supply the maximum degree of expansion required on peak values of input signal, this adjustment of course, being preferably carried out during the reception of the signal; this consideration also applying to the adjustment of the positive feed-back attenuating potentiometer included in the arrangement of Figs. 4 and 5. As pointed out above however, there is no need to advance the positive feed-back control to a region approaching the condition of self-oscillation or zero resistance of the audio frequency amplifying circuits as an ample reserve of gain is available for all normal expansion requirements with this control adjusted to a region considerably removed from oscillation point. In practice as above pointed out, the value of the positive feed-back attenuating resistance 111 is selected so that the positive feed-back circuit supplies a gain increase of some 20 decibels with the positive feed-back attenuating potentiometer 109 at a distance of approximately 25% from its maximum setting.

The circuit operates in the same manner as the arrangement of Fig. 4, but the action is modified by the tuned rejector circuits comprised of the inductance 150, resistance 151 and condenser 152. The foregoing are arranged in series with the positive feed-back path and the similar such circuit comprised of elements 160, 161 and 162 are similarly arranged in series with the negative feed-back path. As pointed out earlier in this specification the object of these circuits is to supply a suitable regulation of the feed-back voltages with respect to frequency to produce a relative increase in the low note response at low volume levels to compensate for the aural deficiency of the ear which, as is well known, is insensitive to the lower audio frequencies at low volume levels. To compensate for this tendency, the tuned circuits above referred to are arranged to operate substantially in the manner of high-pass filters, the frequency - attenuation characteristics of which are adjusted by means of series and shunt resistances included therewith to provide any desired variation in the shape of the frequency response with respect to signal amplitude. Referring to Fig. 8, the shunt resistance associated with the positive feed-back rejector is indicated at 151 and the series resistance associated therewith at 153. Similarly, in the case of the negative feed-back circuit the corresponding resistances are represented at 161 and 182. By increasing the values of the series resistances 153 and 182 in the cases of either feed-back circuit and/or by reducing the values of the shunt resistances 151 and 161, the frequency selectiveness of the rejector circuits in either the positive feed-back circuit or negative feed-back circuit can be reduced to any desired extent, if necessary, so that the circuit behaves as though these circuits were not included—whereas by reducing the values of the series resistances in either case and/or increasing the values of the parallel or shunt resistances, the opposite effect can be achieved and the frequency selectiveness of the rejector circuits can be increased up to the maximum extent permitted by the individual magnifications of these circuits as determined by the resistances presented respectively by the inductances 150 and 160. In the practical adjustment of the system of Fig. 8, the values of the series resistances 153 and 182, together with the values of the shunt resistances 151 and 161, are selected to produce a very gradual slope in the frequency attenuation characteristic so that the amplitude of both the positive and negative feed-back voltages diminishes very slightly and gradually towards the lower (bass) frequency end of the audio spectrum. With this adjustment, it will be seen that at low volume levels when the negative feed-back is at a maximum value, that due to the resultant falling off in the negative feed-back voltages at the lower end of the audio frequency scale due to the action of the rejector circuit in the negative feed-back path, that an increase in the amplitude of the bass frequencies relative to the upper audio frequencies will be produced, whilst at high volume levels there will be a slight diminution in the amplitude of the positive feed-back voltages towards the lower audio frequencies producing an effective increase in the resultant high note response of the system at these volume levels. With this arrangement therefore the resultant overall frequency response of the amplifier is made to slope downwards from left to right, that is to say, from the low to the high frequency end of the audio frequency scale at low volume levels and to slope upwards over the same frequency range at high volume levels. By omitting one of the rejectors or by adjusting the values of the series and shunt resistances associated therewith to render one of the rejectors inoperative either of the above tilts may be imparted to the frequency response curve whilst omitting the other, that is to say, that by omitting or rendering inoperative the rejector circuit associated with the positive feed-back circuit, the accentuation in the frequency response at the lower or bass end of the frequency scale and due to the rejector circuit in the negative feed-back path can be retained at low volume levels, whereas at high volume levels corresponding to maximum expansion, the upward tilt occurring at the high frequency end of the scale can be omitted, or in other words, a level or horizontal response curve may be secured. As will be apparent, practically any desired modification of the frequency response curve can be produced at different volume levels by suitably adjusting the tuning of the rejector circuits 150, 151, 152, and 160, 161, 162, together with the values of the series and/or shunt resistances 153, 151, and 182, 161 respectively, and the applications of the circuit are by no means limited to the example just given which is for merely compensating for the defective aural frequency response of the ear at low volume levels. Other applications of the system are possible and a variety of different aural effects are obtainable by modifying the constants of circuits according to the principles above laid down.

A further advantageous feature of the arrangement shown in Fig. 8 which has not as yet been referred to, consists in the application of negative or inverse feed-back from the anode 101B of output valve 101 to the control grids 102A and 103A respectively of feed-back controlling valve stages 102 and 103, separately. This has the combined advantage of providing means for the regulation of the maximum initial gain of the stages 102 and 103 to any desired extent as well as operating to reduce any distortion of the feed-back voltage incurred in the process of their amplification thereby. In the arrangement previously described with reference to Fig. 4, the otherwise excessive gain of the feed-back controlling stages 102, 103, is offset by the use of suitable values of attenating resistance included in the output anode or cathode circuits thereof, as well as by adjustment of the input feed-back attenuating potentiometers. This arrangement operates satisfactorily but may entail slight distortion of the feed-back voltages at maximum gain. In the arrangement of Fig. 8 anode attenuating resistances 111 and 118 are included in the anode circuits of valves 102 and 103 respectively in addition to separate feed-back attenuating potentiometers 117 and 109 as above described. In addition there is included from the output to the input circuit of each feed-back stage 102 and 103, a separate inverse feed-back circuit comprising in the case of the stage 102, a voltage feed-back potential divider comprising the series connected resistances 104 and 105 of which the resistance 104 is fed from the anode 102C of the stage 102 over a blocking condenser 190 and the other end of the resistance 105 is connected to ground in the manner shown. Amplified voltages in reverse phase to the input voltages applied to grid 102A of valve 102 are developed across the resistances 104 and 105 and a fraction of these determined by the relative values of the resistances 104 and 105, are fed back directly into the control grid circuit by a direct connection of the low potential end of the potentiometer 109 to the junction of the resistances 104 and 105. A similar circuit comprising series connected resistances 106 and 107 fed from the anode 103C of the valve 103 over a condenser 191 is included in the case of the negative feed-back controlling stage 103, the inverse feed-back being introduced into the control grid circuit as before by a direct connection of the low potential end of the input grid attenuating potentiometer to the junction of the resistances 106 and 107. As will be readily apparent for effective operation of the positive and negative feed-back circuits from the output to the input circuits of the preliminary amplifier stages 100 and 101, it is not only unnecessary but even undesirable for the feed-back voltages to undergo additional amplification. In the arrangements previously described, this has been offset by means of the anode attenuating resistances and by adjustment of the input grid feed-back attenuating potentiometers. With the arrangement just described with reference to Fig. 8 however, these adjustments although included, can be dispensed with and the respective gains of the feed-back controlling valves 102 and 103 reduced to unity or substantially less than unity by the simple expedient of sufficiently increasing the values of the resistances 105 and 107 relative to the values of the resistances 104 and 106 respectively, to sufficiently increase the fraction of the anode voltages fed back in reverse phase to the input voltages, with the additional advantage obtaining that all distortion of the feed-back voltages in their passage through the feed-back controlling valves is now completely eliminated.

In an alternative embodiment of the invention, a similar result to that just described can be secured by employing for the feed-back controlling stages, stages of the well known cathode follower type in which conditions automatically obtain corresponding to 100% negative feed-back in consequence of which the gain of this class of stage can never be greater than unity and in practice is considerably less than unity. An additional property of this class of stage which is also applicable to the present invention, resides in its impedance matching properties. Thus the input circuit of the cathode follower may be connected to the output circuit of a preliminary audio amplifier stage and which may be arranged to have a substantially high impedance whilst the output cathode load impedance which can be arranged to be a low value of impedance can be coupled to the primary of a feed-back transformer, the secondary of which is coupled either to the control grid or cathode of the said preliminary amplifier stage or that of a preceding such stage. By the use of a transformer in this way, the design of the circuits can be considerably simplified whilst the phase reversal necessary for the application of positive feed-back over a single stage can be readily effected. An example of an embodiment of the invention employing an arrangement of this kind will be described with reference to Fig. 14.

In addition to the embodiment of the invention shown and described with reference to Fig. 8, an alternative arrangement of the system shown therein is possible substantially as set forth in the provisional specification. In this alternative arrangement, the negative feed-back path shown as operating from the output of the second preliminary stage 101 to the input of the first such stage 100, may be transferred in accordance with principles already described earlier in this specification with reference to Fig. 1 in addition to the special reference thereto included in the provisional specification, from the output circuit of the output stage to the input circuit of the penultimate stage 101, this arrangement of the invention being particularly advantageous in the case where pentode or tetrode output valves are employed in the output stage, as illustrated for example, in the arrangement of Fig. 3. In this arrangement of the invention, the high potential end of the condenser 116 may be connected to the high potential end of a small auxiliary inductance similar to L1 in Fig. 7 or 305 in Fig. 3 and comprising an additional secondary winding in the output transformer whilst the resistance 122 is now connected either to the control grid or cathode circuits of the valve 101 depending on the sense of the winding of the said auxiliary inductance comprising the additional secondary winding of the output transformer in relation to the sense of the winding of the primary of the output transformer. As described earlier in this specification, this arrangement has the advantage of not only supplying effective contrast expansion but of reducing the harmonic distortion in the output stage and due to the curvature of the control characteristics of the pentode or tetrode valves employed therein. As pointed out earlier in this specification however, in order to secure the best results from the point of view of distortion reduction however, the negative feed-back applied over the said output stage or stages should remain fixed or preferably increase with signal amplitude; this latter adjustment of the system being the opposite to that required for contrast expansion. This arrangement of the system may however be included whilst still retaining the essential contrast expansion action as already described earlier in this specification with reference to the arrangement illustrated in Fig. 1 by making provision for the rate of variation of gain of the preliminary stages in response either to automatic variation of positive feed-back and operating in opposition to a preset degree of negative feed-back applied thereacross, or the differential control of positive and negative feed-back occurring thereacross and occurring in the same sense as the variations in input signal amplitude—the requisite condition for the securing of contrast expansion—to occur at a greater rate than the variations in negative feed-back occurring over the output stage or stages as above described for the reduction of distortion and which produces gain variations in opposite sense to the variations in input signal amplitude. Since this particular method of operating the invention has already been dealt with in some detail in the earlier part of this specification, it is considered unnecessary to describe it in any further detail, as from the instructions above given, there is set forth sufficient data for the construction and satisfactory operation of the system.

In the arrangement illustrated in Fig. 9, contrast expansion is secured by means operating to differentially control the relative degrees of positive and negative feed-back applied from the output circuit of a push-pull triode output stage to the input circuit of a penultimate stage, the arrangement adopted in this case for the feed-back controlling valve stages being different from that previously employed in that the anode-cathode paths of the feed-back controlling valves are arranged in series with either feed-back path for controlling the relative degrees of feed-back existing therein in accordance with the principles set forth above.

Referring to Fig. 9, differentially controlled positive and negative feed-back is applied from the output circuit of a push-pull triode output stage comprising triodes 900 and 901 arranged in resistance capacity coupled paraphased push-pull in accordance with a circuit arrangement well known per se, to the input circuit of a triode penultimate stage 902 over circuits including in series therewith the anode-cathode paths of feed-back control valves 903 and 904 respectively, the impedances of which are differentially controlled from automatic contrast control rectifiers 905 and 906 fed respectively with audio signal energy from the secondary 907 of a transformer 907A whose primary 907B is in series with the anode circuit (not shown) of the last stage of an auxiliary amplifier of the kind above referred to, and from the same winding over a feed condenser 908. The control grid 903A of the positive feed-back controlling valve 903 is initially biased negatively to a point approaching cut-off by the battery 909 supplying bias voltage to the grid of the valve 903 through the cathode load resistance 910 of the diode 905 and decoupling resistance 911 and is biased positively from the cathode load resistance 910 by the positive control potential developed thereacross by rectification of the audio signal energy in the diode 905, the amplitude of this said control potential being proportional to the amplitude of the applied audio signal. The control grid 904A of the negative feed-back controlling valve 904 is initially biased to a slight extent negatively from the battery 909, and a negative potential proportional to the applied audio circuit or negative feed-back circuit can be reduced to any desired extent, if necessary, so that the circuit behaves as though these circuits were not included—whereas by reducing the values of the series resistances in either case and/or increasing the values of the parallel or shunt resistances, the opposite effect can be achieved and the frequency selectiveness of the rejector circuits can be increased up to the maximum extent permitted by the individual magnifications of these circuits as determined by the resistances presented respectively by the inductances 150 and 160. In the practical adjustment of the system of Fig. 8, the values of the series resistances 153 and 182, together with the values of the shunt resistances 151 and 161, are selected to produce a very gradual slope in the frequency attenuation characteristic so that the amplitude of both the positive and negative feed-back voltages diminishes very slightly and gradually towards the lower (bass) frequency end of the audio spectrum. With this adjustment, it will be seen that at low volume levels when the negative feed-back is at a maximum value, that due to the resultant falling off in the negative feed-back voltages at the lower end of the audio frequency scale due to the action of the rejector circuit in the negative feed-back path, that an increase in the amplitude of the bass frequencies relative to the upper audio frequencies will be produced, whilst at high volume levels there will be a slight diminution in the amplitude of the positive feed-back voltages towards the lower audio frequencies producing an effective increase in the resultant high note response of the system at these volume levels. With this arrangement therefore the resultant overall frequency response of the amplifier is made to slope downwards from left to right, that is to say, from the low to the high frequency end of the audio frequency scale at low volume levels and to slope upwards over the same frequency range at high volume levels. By omitting one of the rejectors or by adjusting the values of the series and shunt resistances associated therewith to render one of the rejectors inoperative either of the above tilts may be imparted to the frequency response curve whilst omitting the other, that is to say, that by omitting or rendering inoperative the rejector circuit associated with the positive feed-back circuit, the accentuation in the frequency response at the lower or bass end of the frequency scale and due to the rejector circuit in the negative feed-back path can be retained at low volume levels, whereas at high volume levels corresponding to maximum expansion, the upward tilt occurring at the high frequency end of the scale can be omitted, or in other words, a level or horizontal response curve may be secured. As will be apparent, practically any desired modification of the frequency response curve can be produced at different volume levels by suitably adjusting the tuning of the rejector circuits 150, 151, 152, and 160, 161, 162, together with the values of the series and/or shunt resistances 153, 151, and 182, 161 respectively, and the applications of the circuit are by no means limited to the example just given which is for merely compensating for the defective aural frequency response of the ear at low volume levels. Other applications of the system are possible and a variety of different aural effects are obtainable by modifying the constants of circuits according to the principles above laid down.

A further advantageous feature of the arrangement shown in Fig. 8 which has not as yet been referred to, consists in the application of negative or inverse feed-back from the anode 101B of output valve 101 to the control grids 102A and 103A respectively of feed-back controlling valve stages 102 and 103, separately. This has the combined advantage of providing means for the regulation of the maximum initial gain of the stages 102 and 103 to any desired extent as well as operating to reduce any distortion of the feed-back voltage incurred in the process of their amplification thereby. In the arrangement previously described with reference to Fig. 4, the otherwise excessive gain of the feed-back controlling stages 102, 103, is offset by the use of suitable values of attenating resistance included in the output anode or cathode circuits thereof, as well as by adjustment of the input feed-back attenuating potentiometers. This arrangement operates satisfactorily but may entail slight distortion of the feed-back voltages at maximum gain. In the arrangement of Fig. 8 anode attenuating resistances 111 and 118 are included in the anode circuits of valves 102 and 103 respectively in addition to separate feed-back attenuating potentiometers 117 and 109 as above described. In addition there is included from the output to the input circuit of each feed-back stage 102 and 103, a separate inverse feed-back circuit comprising in the case of the stage 102, a voltage feed-back potential divider comprising the series connected resistances 104 and 105 of which the resistance 104 is fed from the anode 102C of the stage 102 over a blocking condenser 190 and the other end of the resistance 105 is connected to ground in the manner shown. Amplified voltages in reverse phase to the input voltages applied to grid 102A of valve 102 are developed across the resistances 104 and 105 and a fraction of these determined by the relative values of the resistances 104 and 105, are fed back directly into the control grid circuit by a direct connection of the low potential end of the potentiometer 109 to the junction of the resistances 104 and 105. A similar circuit comprising series connected resistances 106 and 107 fed from the anode 103C of the valve 103 over a condenser 191 is included in the case of the negative feed-back controlling stage 103, the inverse feed-back being introduced into the control grid circuit as before by a direct connection of the low potential end of the input grid attenuating potentiometer to the junction of the resistances 106 and 107. As will be readily apparent for effective operation of the positive and negative feed-back circuits from the output to the input circuits of the preliminary amplifier stages 100 and 101, it is not only unnecessary but even undesirable for the feed-back voltages to undergo additional amplification. In the arrangements previously described, this has been offset by means of the anode attenuating resistances and by adjustment of the input grid feed-back attenuating potentiometers. With the arrangement just described with reference to Fig. 8 however, these adjustments although included, can be dispensed with and the respective gains of the feed-back controlling valves 102 and 103 reduced to unity or substantially less than unity by the simple expedient of sufficiently increasing the values of the resistances 105 and 107 relative to the values of the resistances 104 and 106 respectively, to sufficiently increase the fraction of the anode voltages fed back in reverse phase to the input voltages, with the additional advantage obtaining that all distortion of the feed-back voltages in their passage through the feed-back controlling valves is now completely eliminated.

In an alternative embodiment of the invention, a similar result to that just described can be secured by employing for the feed-back controlling stages, stages of the well known cathode follower type in which conditions automatically obtain corresponding to 100% negative feed-back in consequence of which the gain of this class of stage can never be greater than unity and in practice is considerably less than unity. An additional property of this class of stage which is also applicable to the present invention, resides in its impedance matching properties. Thus the input circuit of the cathode follower may be connected to the output circuit of a preliminary audio amplifier stage and which may be arranged to have a substantially high impedance whilst the output cathode load impedance which can be arranged to be a low value of impedance can be coupled to the primary of a feed-back transformer, the secondary of which is coupled either to the control grid or cathode of the said preliminary amplifier stage or that of a preceding such stage. By the use of a transformer in this way, the design of the circuits can be considerably simplified whilst the phase reversal necessary for the application of positive feed-back over a single stage can be readily effected. An example of an embodiment of the invention employing an arrangement of this kind will be described with reference to Fig. 14.

In addition to the embodiment of the invention shown and described with reference to Fig. 8, an alternative arrangement of the system shown therein is possible substantially as set forth in the provisional specification. In this alternative arrangement, the negative feed-back path shown as operating from the output of the second preliminary stage 101 to the input of the first such stage 100, may be transferred in accordance with principles already described earlier in this specification with reference to Fig. 1 in addition to the special reference thereto included in the provisional specification, from the output circuit of the output stage to the input circuit of the penultimate stage 101, this arrangement of the invention being particularly advantageous in the case where pentode or tetrode output valves are employed in the output stage, as illustrated for example, in the arrangement of Fig. 3. In this arrangement of the invention, the high potential end of the condenser 116 may be connected to the high potential end of a small auxiliary inductance similar to L1 in Fig. 7 or 305 in Fig. 3 and comprising an additional secondary winding in the output transformer whilst the resistance 122 is now connected either to the control grid or cathode circuits of the valve 101 depending on the sense of the winding of the said auxiliary inductance comprising the additional secondary winding of the output transformer in relation to the sense of the winding of the primary of the output transformer. As described earlier in this specification, this arrangement has the advantage of not only supplying effective contrast expansion but of reducing the harmonic distortion in the output stage and due to the curvature of the control characteristics of the pentode or tetrode valves employed therein. As pointed out earlier in this specification however, in order to secure the best results from the point of view of distortion reduction however, the negative feed-back applied over the said output stage or stages should remain fixed or preferably increase with signal amplitude; this latter adjustment of the system being the opposite to that required for contrast expansion. This arrangement of the system may however be included whilst still retaining the essential contrast expansion action as already described earlier in this specification with reference to the arrangement illustrated in Fig. 1 by making provision for the rate of variation of gain of the preliminary stages in response either to automatic variation of positive feed-back and operating in opposition to a preset degree of negative feed-back applied thereacross, or the differential control of positive and negative feed-back occurring thereacross and occurring in the same sense as the variations in input signal amplitude—the requisite condition for the securing of contrast expansion—to occur at a greater rate than the variations in negative feed-back occurring over the output stage or stages as above described for the reduction of distortion and which produces gain variations in opposite sense to the variations in input signal amplitude. Since this particular method of operating the invention has already been dealt with in some detail in the earlier part of this specification, it is considered unnecessary to describe it in any further detail, as from the instructions above given, there is set forth sufficient data for the construction and satisfactory operation of the system.

In the arrangement illustrated in Fig. 9, contrast expansion is secured by means operating to differentially control the relative degrees of positive and negative feed-back applied from the output circuit of a push-pull triode output stage to the input circuit of a penultimate stage, the arrangement adopted in this case for the feed-back controlling valve stages being different from that previously employed in that the anode-cathode paths of the feed-back controlling valves are arranged in series with either feed-back path for controlling the relative degrees of feed-back existing therein in accordance with the principles set forth above.

Referring to Fig. 9, differentially controlled positive and negative feed-back is applied from the output circuit of a push-pull triode output stage comprising triodes 900 and 901 arranged in resistance capacity coupled paraphased push-pull in accordance with a circuit arrangement well known per se, to the input circuit of a triode penultimate stage 902 over circuits including in series therewith the anode-cathode paths of feed-back control valves 903 and 904 respectively, the impedances of which are differentially controlled from automatic contrast control rectifiers 905 and 906 fed respectively with audio signal energy from the secondary 907 of a transformer 907A whose primary 907B is in series with the anode circuit (not shown) of the last stage of an auxiliary amplifier of the kind above referred to, and from the same winding over a feed condenser 908. The control grid 903A of the positive feed-back controlling valve 903 is initially biased negatively to a point approaching cut-off by the battery 909 supplying bias voltage to the grid of the valve 903 through the cathode load resistance 910 of the diode 905 and decoupling resistance 911 and is biased positively from the cathode load resistance 910 by the positive control potential developed thereacross by rectification of the audio signal energy in the diode 905, the amplitude of this said control potential being proportional to the amplitude of the applied audio signal. The control grid 904A of the negative feed-back controlling valve 904 is initially biased to a slight extent negatively from the battery 909, and a negative potential proportional to the applied audio signal and developed across the anode load resistance 906A of the diode 906 is also applied to the control grid 904A of the valve 904 over the decoupling resistance 914. The positive feed-back circuit commences from the junction of the resistances 920 and 921 shunted across the primary winding 922A representing the anode load of the first push-pull triode output stage 900 and comprising one-half of the primary winding of the output transformer 922 and is continued to anode 903B through the anode-cathode path of the positive feed-back controlling valve 903 to the junction of the junction of the resistances 923 and 924 included in the grid circuit of the penultimate stage 902, the feed-back voltages being developed across the section 924 and applied to the control grid over the section 923. Similarly, the negative feed-back circuit commences at the junction of the resistances 930 and 931 shunted across the primary winding 922B of transformer 922 and continues to anode 904B through the anode-cathode path of the negative feed-back controlling valve 904 to the junction of the resistances 923 and 924 located in the grid circuit of the penultimate stage 902. Automatic control of the frequency response as the gain level is varied is secured by the inclusion of the audio frequency resonant circuits 940 and 941 in parallel with the resistances 921 and 931 respectively, the effective frequency response of which may be regulated to correspond with any desired frequency-attenuation characteristic by adjustment of the series resistances 942 and 943 and/or the values of the shunt, connected damping resistances 944 and 945. In order to secure automatic bass compensation at low volume levels of the kind above described, both of the audio frequency tuned circuits 940 and 941 should be tuned towards the upper end of the audio frequency scale, for example, a frequency of 8–10,000 cycles. In the adjustment of the frequency-attenuation characteristics of either of the tuned circuits 940 and 941, the following rules apply. Increase of the values of the series resistances 942 and 943 and/or reduction the damping resistances 944 and 945 has the effect of flattening the response curve of either filter to any desired extent, that is to say, by sufficiently increasing the former and reducing the latter the frequency-attenuation characteristic may be rendered horizontal, or the effect on the tuned filters 940 and 941 is completely removed. By reducing the values of the series resistances and/or by increasing the values of the shunt resistances on the other hand, the slope of the frequency-attenuation characteristic may be increased to any desired extent. Thus with the circuit tuned to the upper end of the audio frequency range as above described, the effect of the tuned circuit 940 in parallel with the positive feed-back circuit is to tilt the frequency response curve of the amplifier upwards towards the right (that is to say, towards the high frequency end of the scale) to high volume levels, whereas the effect of the tuned circuit 941 in parallel with the negative feed-back circuit has the opposite effect of tilting the curve upwards towards the left (that is to say, towards the bass end of the frequency scale) at low volume levels, the latter effect corresponding to that desired for compensating for the defective bass response of the ear at low volume levels. The degree of the accentuation of the bass frequencies can be regulated by adjustment of the relative values of the resistances above referred to, in the manner above indicated.

It should be observed that a similar effect to that just described can be secured by including series resonant circuits in series with either feed-back path, for example from the junction of the resistances 920 and 921 to the anode 903B of the valve 903 and from the junction of the resistances 930 and 931 to the anode 904B of the valve 904. In this case, the resonant frequencies of the series circuits should, as in the previous example with reference to the parallel tuned audio frequency circuits shown in Fig. 9, be adjusted to correspond to the upper end of the audio frequency range in order to provide the necessary bass compensation effect above described. It should also be observed, that the system of push-pull connection adopted for the triodes 900 and 901 is similar to that shown with reference to the pentodes 303 and 304 in Fig. 3 and corresponds to the well known system of paraphased resistance-capacity coupled push-pull. In the arrangement of Fig. 9, the phase reversed input to the second push-pull triode 901 is obtained directly from the anode circuit of the first push-pull triode 900 through the attenuating potential divider comprised of series-connected resistances 950, 951 fed from the anode 900A of the stage 900 through the blocking condenser 952. As an alternative and preferable arrangement of resistance capacity coupled push-pull for use with any of the arrangements above described, but which entails the use of one additional valve, the phase-reversed output to the second push-pull stage may be secured from the grid circuit of the first push-pull stage through the medium of a separate phase reversing valve having a resistive anode load and deriving its input from the said grid circuit over an attenuating potential divider the relative values of the upper and lower arms of which are proportioned to supply a voltage input to the second push-pull stage exactly equal in magnitude to the voltage applied to the grid of the first push-pull stage but differing in phase by 180 degrees whereby the correct condition for push-pull operation is secured.

Figure 15:
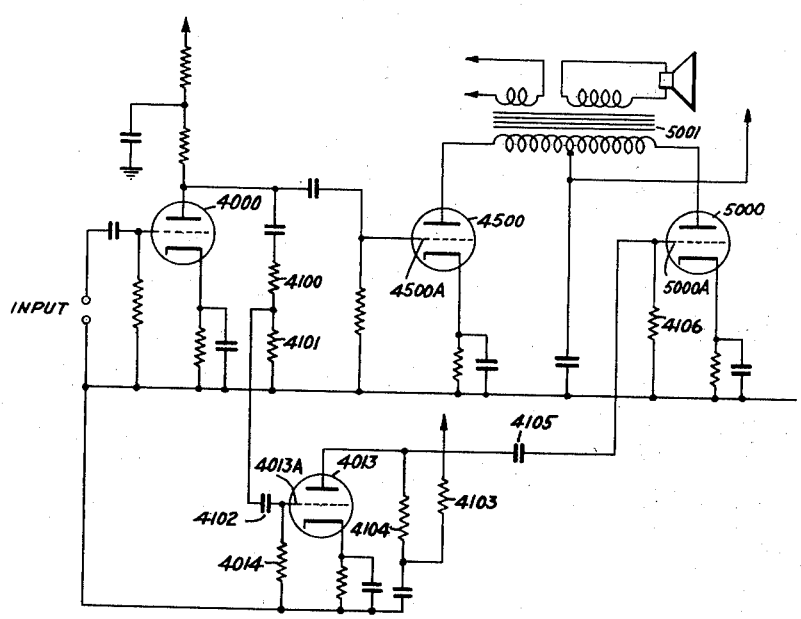
Fig. 15 illustrates a preferred arrangement of the circuits of the output stage of the main amplifier for use with any of the foregoing arrangements in accordance with the invention.

The principal advantage resulting from this system of push-pull connection over that shown in Figs. 3 and 9 resides in that a more exactly phase reversed input is secured to the input of the second stage since this is now derived from a purely resistive load located in the anode circuit of the phase reversing stage instead of from a substantially inductive load which obtains in the case of the ordinary para-phase connection shown in the arrangements of Figs. 3 and 9, wherein the load across which the voltages for application to the input of the second stage are taken, comprises one-half of the primary winding of the output transformer, and which is substantially inductive. Due to the phase displacing action of the latter, the phase of the input to the second stage is not exactly 180 degrees out of phase with the input to the first stage, but sufficiently so to enable a modified form of push-pull operation to be secured. In order to completely eliminate this disadvantage it is recommended that a separate phase reversing valve be employed to secure the phase reversed input to the second push-pull stage instead of the somewhat simpler paraphase connection shown in Figs. 3, 7 and 9, and in order to avoid any ambiguity, the complete circuit of a suitable resistance capacity coupled push-pull amplifier employing a separate phase reversing valve is shown in Fig. 15, this arrangement being suitable for use with any of the embodiments of the invention hereinbefore described and may advantageously displace the simpler paraphase system shown in Figs. 3, 7 and 9.

The operation of the system will be fairly clear from the foregoing. In the absence of an input audio signal (that is to say, with the input audio signal at zero amplitude), the positive feed-back valve 903 is biased to nearly cut-off by the battery 909 and in consequence, the value of the anode-cathode impedance of the valve is raised to the order of several megohms so that the positive feed-back is reduced to practically zero. Simultaneously, the negative feed-back controlling valve 904 is at minimum bias and therefore presents a low impedance of the order of a few thousand ohms from anode to cathode. The applied negative feed-back is therefore at a maximum value with the result that the over all gain of the main amplifier stages 900, 901, and 902 is reduced to a fairly low value. Considering now the application to the input of the amplifier of an audio signal of steadily increasing amplitude then a steadily increasing positive control bias is applied from the cathode load resistance 910 of the rectifier 905 to the control grid 903A of the positive feed-back controlling valve 903 with the result that the anode to cathode impedance thereof steadily decreases, producing in turn a steady increase in the degree of positive feed-back applied over the stages 900, 901, and 902. The combined effect of the steady increase in positive feed-back together with the steady decrease in negative feed-back produces a steady increase in the overall gain of the main audio amplifier comprising the stages 900, 901 and 902 which as in the foregoing arrangements continues up to the maximum value of the input audio signal thereby providing the essential contrast expansion action. Due to the action of the filters 940 and 941 the proportion of treble response to bass response steadily increases with amplifier gain and vice versa, thereby compensating for the disproportionate frequency response of the ear at different volume levels. In common with the previous arrangements already described with reference to the foregoing figures, this arrangement enables a wide range of volume expansion to be secured with practically complete absence of distortion at all volume levels.

In the adjustment and operation of the tuned audio frequency filters such as 940 and 941 just described with reference to Fig. 9, circuit the effective decrement of which is rendered adjustable by means of the series and parallel resistances included therewith in the manner above described, it may be found that with the parallel resistances 944 and 945 adjusted to high values and the series resistances 942 and 943 adjusted to low values to secure the maximum variation in frequency response with respect to signal amplitude, that the change in the frequency response at low or high volume levels is too sharply peaked. Whilst this may be offset by increasing the effective damping of the circuits by reducing the values of the parallel resistances 944 and 945, it may then be found that insufficient variation in the overall frequency response is obtained. To correct this it is only necessary to remove the tuning capacities of the circuits 940 and 941 thereby leaving only the inductances in circuit and to adjust the frequency-attenuation characteristic of the system by regulation of the sizes of the series resistances 942 and 943. Increasing the sizes of these resistances produces the effect of flattening the frequency-attenuation characteristics of either feed-back path, whereas reducing the values of these resistances has the effect of increasing the degree of attenuation of the feed-back voltages in either path as the input audio frequency is reduced. This reduction of the low-frequency response of the feed-back circuits operates more gradually than in the arrangement above described and employing tuned filters. The same modification can be readily carried out in the case of all the arrangements hereinbefore described, in cases wherein a more gradual change in the frequency response is required. In the case of the frequency compensation circuit shown and described with references to Fig. 8 for example, in which tuned rejector circuits 150, 152 and 160, 162 are included in either feed-back path, these circuits being tuned to the low frequency end of the audio frequency range, it may be found that with the parallel resistances 151 and 161 set at a high value to secure the maximum variation in frequency response with respect to variation in signal level, that the accentuation, in the bass frequencies which occurs at low volume levels and the accentuation of the higher audio frequencies at high volume levels tends to be too sharply peaked, whereas if this effect is off-set by reduction of the parallel resistances 151 and 161 and/or increase of the series resistances 153 and 182, that insufficient variation of the frequency response is obtained. In order to correct for this, either of two courses may be adopted. Either the inductances 150 and 160 may be disconnected and the required adjustment of the frequency response may be effected by regulation of the size of the capacities 152 and 162 together with the values of the series resistances 153 and 182 or alternatively, the parallel resistances 151 and 161 may be reduced to zero to effectively short circuit the tuned filters to render them inoperative and the inductances 150 and 160 disconnected and transferred in series with adjustable resistances either in parallel with the cathode impedance of valve 100 comprising resistances 114 and 115 in series in the case of the positive feed-back path and in parallel with the resistive anode impedance 119 of the negative feed-back controlling stage 103, in the case of the negative feed-back path. Alternatively, but not shown, the inductances 150 and 160 in series with adjustable resistances may be transferred to the grid circuits of the feed-back controlling valves 102 and 103 in which case the inductance-resistance series combination is connected between the sliders of the feed-back attenuating potentiometers 109 and 117 and earth in the case of the positive and negative feed-back paths respectively. In either case the frequency accentuation characteristic with volume level may be adjusted by regulation of the size of the said variable resistance included in series with the said inductances 150 and 160, the slope of the characteristic increasing as the values of the series resistances are reduced and vice-versa.

In a still further alternative arrangement of the frequency compensation circuits the rejector circuits 150, 152 and 160, 162 may be retained exactly as shown in Fig. 8 whilst in addition there is also included in parallel with the resistive anode loads 113 and 119 of the positive and negative feed-back controlling stages 102 and 103 respectively, additional networks such as the resistance 153 and the circuits 150, 151 and 152, the respective resonant frequencies of which are adjusted to the high frequency end in the audio frequency range, that is to say, the resonant frequencies of the said additional tuned circuits included in parallel with the resistances 113 and 119 are adjusted to frequencies from 8–10,000 cycles and the dampings of these circuits together with the dampings of the rejector circuits 150, 152 and 160, 162 increased to a fairly high value by reduction of the parallel resistances 151 and 161 to a fairly low value together with a corresponding reduction in the values of the similar such resistances included in parallel with the said tuned circuits included in shunt with the resistive anode impedances 113 and 119 of the positive and negative feed-back controlling valve stages 102 and 103.

Figure 11:
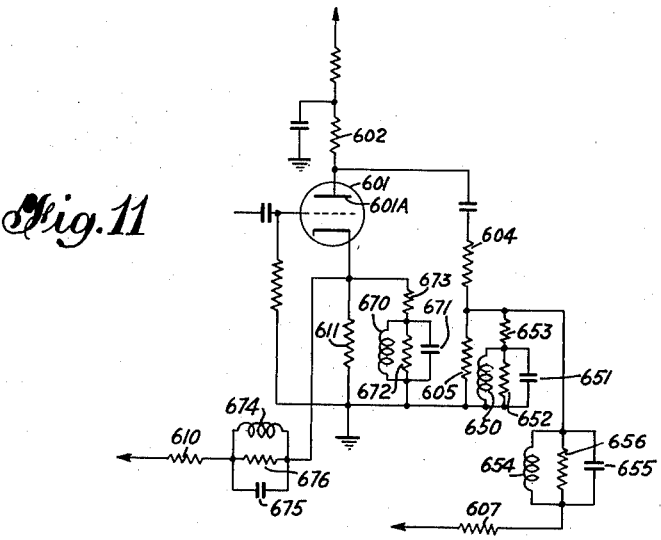
Fig. 11 illustrates a circuit arrangement for the application of automatic regulation of frequency response to the arrangement of Fig. 6.

The complete circuit arrangement of a similar modification to that just described and applied to the arrangement shown in Fig. 6 is shown in Fig. 11.

Referring to Fig. 11, there is shown therein the circuit arrangement of the last stage 601 together with the positive and negative feed-back paths emanating from the output anode and cathode circuits thereof and including the additional refinement of automatic frequency correction effected by a circuit arrangement similar to that just described with reference to Fig. 8. Referring to Fig. 11, the circuit elements corresponding with those shown in Fig. 6 are indicated by the same reference numerals. The required adjustment of the frequency-attenuation characteristic of the positive feed-back path is effected by the inclusion of the parallel tuned circuit network comprising inductance 650, capacity 651 and resistances 652 and 653 arranged in parallel with the lower arm 605 of the potential divider 604, 605 from which the positive feed-back voltages are derived together with the tuned parallel circuit network comprising inductance 654, capacity 655 and resistances 666 and 607 and arranged in series with the positive feed-back circuit as a rejector impedance. Similarly, the required adjustment of the frequency-attenuation characteristic of the negative feed-back circuit is effected by the inclusion of the parallel tuned circuit network comprising the inductance 670, capacity 671 and resistances 672 and 673 arranged in parallel with the cathode resistance 611 of valve 601 from across which the negative feed-back voltages are derived together with the tuned parallel circuit network comprising the inductance 674, capacity 675 and resistances 676 and 610 arranged in series with the negative feed-back circuit as a rejector impedance.

In the adjustment of the system for producing a gradual slope to the frequency-attenuation characteristic of either feed-back path to enable the frequency compensation effect above described to be secured, the resonant frequencies of the tuned circuits 652, 653 and 674, 675 included in series with either feed-back path are adjusted as before to the low frequency end of the audio range whereas the resonant frequencies of the tuned circuits 650, 651 and 670, 671, and arranged substantially in parallel with either feed-back path are adjusted towards the high frequency end of the audio range, that is to say, in the region of 8–10,000 cycles as already described with reference to the foregoing example. In order to secure the gradual slope to the frequency-attenuation characteristic above referred to, the dampings of the tuned circuits just referred to is increased to a substantially high level by supplying comparatively low values to the parallel resistances 652, 672, 656 and 676 associated therewith, whilst the values of the series resistances 653, 673, 607 and 610 are adjusted to substantially medium values. This arrangement although more complex than the simple inductance resistance series circuit has the advantage of introducing considerably less phase shift of the voltages fed-back for a given degree of slope imparted to the frequency attenuation characteristic, that is to say, considerably less phase shift is incurred than if a similar result was secured by the simpler expedient of connecting a series inductance resistance combination for example across the resistance 609 of Fig. 6 forming the low arm of the grid circuit potential divider of the valve 600 and across which both positive and negative feed-back voltages are developed.

In the foregoing circuits in accordance with the present invention, differential control of positive and negative feed-back has involved the use of a pair of feed-back controlling valve stages one for either feed-back path. In the arrangement illustrated in Fig. 12, the same result is secured by means of only one feed-back controlling valve and is therefore applicable in cases wherein it is desired to carry out the invention with only a limited number of valves.

Figure 12:
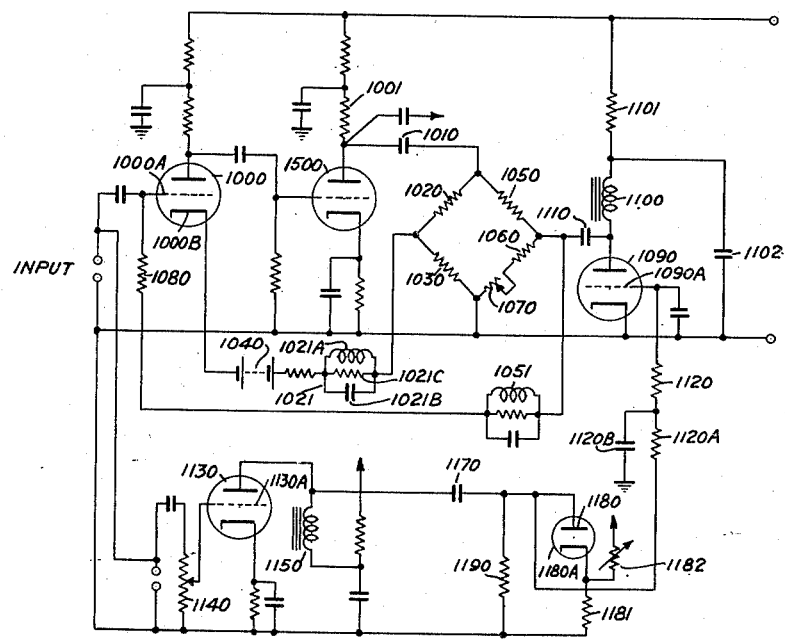
Fig. 12 illustrates a further circuit arrangement embodying the invention.

Referring to Fig. 12, the preliminary stages of the amplifier comprise as in the foregoing arrangements, a pair of resistance-capacity coupled triode stages 1000 and 1500. Connected effectively across the output load resistance 1001 of the second stage 1500 through a blocking condenser 1010 is one diagonal of a resistance bridge comprising four arms including resistances 1020, 1030, 1050 and 1060 in series with the adjustable resistance 1070. Positive audio frequency feed-back is applied from the output circuit of the stage 1500 to the input circuit of the stage 1000 from the junction of the resistances 1050 and 1060 over a damped rejector circuit 1051 and series feed resistance 1080 to the control grid 1000A of the first stage 1000, whilst negative audio frequency feed-back is also applied over these stages from the junction of the resistances 1020 and 1030 to the cathode 1000B of the first stage 1000 over a further damped rejector circuit 1021 comprised of inductance 1021A, condenser 1021B, and resistance 1021C, all in parallel, and balancing bias battery 1040.

The anode-cathode path of a feed-back controlling stage 1090 is connected over a blocking condenser 1110 across the lower arm of the bridge comprising in series the resistance 1060 and adjustable resistance 1070. The anode circuit of the controlling valve 1090 is completed over a low-frequency choke 1100 and decoupling resistance 1101, a decoupling condenser 1102 of substantially large capacity being connected from the junction of the choke 1100 and resistance 1101 to earth. A single stage auxiliary amplifier 1130 for producing contrast control voltage derives its input in parallel with the control grid circuit of the first amplifier stage 1000 over an adjustable input potentiometer 1140. The anode circuit of the auxiliary amplifier 1130 feeds the anode 1180 of a diode contrast control rectifier 1180A with audio signal energy over a choke-capacity coupling circuit comprising a low frequency choke 1150 and coupling capacity 1170. Negative contrast control voltage in proportion to audio signal amplitude is developed across the diode anode load resistance 1190 and applied over a resistance capacity control filter 1120 to the control grid 1090A of the feed-back control valve 1090. An adjustable negative delay voltage may be applied to the anode 1180 of the diode 1180A over the diode cathode resistance 1181 by the voltages developed thereacross from a source of positive potential connected thereto over the adjustable resistance 1182 which enables adjustment of the delay voltage to be effected.

The operation of the circuit will be understood from the following description: With the resistance bridge balanced by adjustment of the resistance 1070, the audio frequency voltages appearing at the junction of the resistances 1020 and 1030 and applied to the cathode of the valve 1000 are identical in amplitude and phase to the audio frequency voltages appearing at the junction of the resistances 1050 and 1060 and applied to the control grid of the valve 1000. In consequence, the grid 1000A and cathode 1000B of the first amplifier stage 1000 are at the same audio frequency potential as regards the voltages fed back thereto over the said resistance bridge from the output of the second amplifier stage 1500, and no effective feed-back either positive or negative is in evidence from the output to the input of the amplifier stages 1000 and 1500. If now the resistance 1070 be increased by a small amount the bridge becomes unbalanced and the positive feed-back voltages applied from the junctions of the resistances 1050 and 1060 and applied to the control grid 1000A of the valve 1000 exceed in amplitude the negative feed-back voltages applied from the junction of the resistances 1020 and 1030 to the cathode 1000B of the valve 1000 in consequence of which the resultant feed-back now taking place from the output of the stage 1500 to the input of the stage 1000 is positive or regenerative. The degree of this resultant positive feed-back may be increased if desired to bring the system to audio frequency oscillation point by sufficiently increasing the resistance 1070. Similarly, by reducing the value of the resistance 1070 below the value above referred to and which produces the condition of balance in the bridge network the negative feed-back voltages applied to the cathode 1000B of the valve 1000 from the junction of the resistances 1020 and 1030 exceeds the positive feed-back voltages applied to the control grid 1000A thereof from the junction of the resistances 1050 and 1060, with the result that the overall resultant feed-back obtaining from the output of the stage 1500 to the input of the stage 1000 is negative in sign the degree of which may be increased to depress the initial gain of the stages 1000 and 1500 to any desired extent by sufficiently reducing the value of the resistance 1070. It will readily be seen therefore, that the feed-back applied from the output of the stage 1500 to the input of the stage 1000 can be adjusted from a large value negative to a large value positive simply by increasing the resistance 1070. This effect is accomplished automatically under the control of incoming signal amplitude by automatic variation of the anode-cathode impedance of the feed-back controlling stage 1090 which, for audio frequencies, is connected across the lower arm of the bridge comprising the series connected resistances 1060 and 1070 and which therefore automatically controls the effective value of resistance included in this arm of the bridge for audio frequencies. Initially, the bias voltage applied to the control grid 1090A of the valve 1090 is at a small negative value or preferably zero as obtains in the case of the circuit of Fig. 12, in order to render the anode-cathode impedance of this stage at a minimum or low value and may conveniently be of the order of a few thousand ohms. In this condition which obtains in the absence of a signal, the effective resistance of the lower arm of the bridge network and comprising the series connected resistances 1060 and 1070 is at a minimum for audio frequencies, in consequence of which the negative feed-back voltages applied to the cathode 1000B of the valve 1000 from the junction of the resistances 1020 and 1030 of the bridge considerably exceeds the positive feed-back applied to the control grid 1000A thereof from the junction of the resistances 1050 and 1060.

The initial adjustment of the system is carried out by means of the resistance 1070 which is adjusted with the valve 1090 disconnected or biased to cut-off to increase the degree of positive feed-back to bring the gain of the system to the maximum value likely to be required for a full expansion effect on loud passages and which may be as close to oscillation point of the whole system as desired. With the valve 1090 now connected in circuit or the cut-off bias removed (this latter only being applied for initial adjustment purposes instead of disconnecting the valve 1090) the connections now being as shown in Fig. 12, the low impedance of the valve 1090 in the absence of a signal and in shunt with the lower arm of the bridge comprising resistances 1060 and 1070 in series, causes the bridge to be unbalanced in the opposite direction to that which obtained with this valve biased to cut-off, that is to say, the negative feed-back voltages now considerably exceed the positive feed-back voltages and the gain of the amplifier stages 1000 and 1500 is reduced to a medium or low value. Considering now the application of an audio signal of steadily increasing amplitude to the input terminals of the amplifier, the amplified signal voltage fed to the anode 1180 of the diode 1180A from the anode of the auxiliary amplifier 1130 steadily increases producing a steadily increasing negative rectified potential across the diode load resistance 1190 which is applied to the control grid 1090A of the valve stage 1090 over the filter comprised of series-connected resistances 1120 and 1120A and having condenser 1120B shunting their junction point to ground causing a steady increase in the anode cathode impedance of this valve which, being in shunt with the lower arm of the bridge above referred to causes a steady increase in the impedance of this arm and therefore causes a steady reduction in the degree of negative feed-back applied to the amplifier and also a steady increase in the opposing positive feed-back which continues until the valve 1090 is biased to cut-off by the negative control bias applied to the control grid 1090A thereof when the gain of the system has now reached its maximum value as determined by the initial setting of the resistance 1070 with the valve 1090 disconnected or biased to cut-off in the manner above described.

From the foregoing description therefore, it will be seen that the overall gain of the stages 1000 and 1500 steadily increases with signal amplitude due to the steady reduction of the initially applied negative feed-back from the junction of the resistances 1020 and 1030 of the resistance bridge to the cathode 1000B of the valve 1000, and which continues immediately after the said negative feed-back has been completely cut-off by the steadily increasing positive feed-back applied to the control grid 1000A of the valve 1000 over the resistance 1080 and rejector circuit 1051 from the junction of the resistances 1050 and 1060, and which continues until the valve 1090 is biased to cut-off by the control bias when the gain of the system reaches a maximum value determined by the maximum value of positive feed-back obtaining under these conditions of operation and as determined by the initial setting of the resistance 1070. The action of the damped rejector circuits 1021 and 1051 will be understood from the descriptions of the operations of simiar circuits with reference to the foregoing arrangements, but it should be pointed out that their action may be supplemented by additional tuned circuit networks substantially as described with reference to Fig. 11 to secure the effects described with reference thereto.

It should be noted that the valve 1090 may be included directly in the bridge network in place of the series resistances 1060 and 1070 in which case the anode load resistance 1001 of valve 1500 is preferably substituted by a low frequency choke and the blocking condenser 1010 is omitted, such condensers now being placed in series with either feed-back circuit the cathode circuit of the stage 1000 now being completed over a further choke or resistance. The arrangement shown and above described is however to be preferred to the latter arrangement. If desired, the anode-cathode path of the feed-back controlling valve 1090 may be connected across any other arm of the bridge. Alternatively, the anode-cathode impedance of the valve 1090 may be substituted by a dry rectifier, the impedance of which changes with the applied signal potential and which may be connected across any of the arms of the bridge preferably either of the lower arms thereof. In the case of the latter arrangement, the valve 1090 and the diode 1180 may be omitted. The dry rectifier may be of the kind known under the trade name "Westector" and comprises essentially a special form of copper oxide rectifier. Any of these arrangements may be provided without departing from the scope of this invention, but the particular arrangement of the invention above described with reference to Fig. 12 is preferred on account of the sensitivity of control, the wide range of expansion, and the freedom from distortion obtainable therewith.

Figure 13:
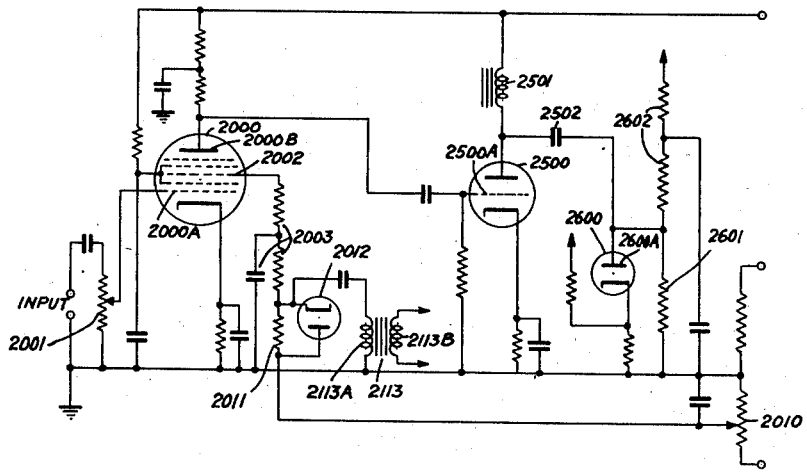
Fig. 13 illustrates one possible form of a gain controlled auxiliary amplifier for use in conjunction with any of the arrangements in accordance with the invention.

In Fig. 13 is shown one possible form which the auxiliary amplifier feeding signal energy to the contrast control rectifiers may conveniently assume, provision being included for automatically controlling the gain of this said auxiliary amplifier in accordance with signal amplitude for the purpose set out above and substantially as described in the British Patent 518,128.

Referring to Fig. 13, the first stage of the auxiliary amplifier comprises a hexode valve 2000 the control grid 2000A of which is fed with input signal energy over the adjustable input potentiometer 2001 the anode 2000B thereof being resistance capacity coupled to the control grid 2500A of a succeeding triode output stage 2500, the anode circuit of which feeds over a choke 2501 and capacity 2502 the anode 2600A of a diode contrast control rectifier 2600. Negative contrast control voltage developed across the diode load resistance 2601 is led off to a feed-back controlling valve such as 1090 (Fig. 12) over a resistance-capacity filter 2602 as indicated by the arrow. An additional control rectifier supplying positive control voltage as described with reference to the foregoing arrangements may of course, be fed with signal energy in parallel with the diode 2600 from the anode circuit of the last stage 2500.

As above indicated provision is made in the arrangement of Fig. 13 for automatically controlling the gain of the auxiliary amplifier in accordance with input signal amplitude such that the gain thereof increases therewith and vice-versa to produce effective amplification of the contrast control action in cases wherein this may be required as for example, wherein unilateral control is adopted as above described. Referring again to Fig. 13 a potentiometer 2010 connected to a negative source is provided to supply a large negative bias for the auxiliary grid 2002 of the valve 2000 to considerably reduce the initial gain of the system, automatic positive control bias being applied thereto over a filter 2003 from the cathode end of the load resistance 2011 of the auxiliary diode 2012 fed with signal energy from the secondary 2013A of the transformer 2013 the primary 2013B of which may be shunt fed from a point in the main amplifier or from the output of a further auxiliary amplifier substantially in the manner set forth in the British Patent No. 518,128 relating to automatic gain control arrangements as applied to radio frequency systems. The gain of the auxiliary amplifier may of course be controlled in the manner just indicated by means of differentially controlled feed-back but this refinement is considered unnecessary in an amplifier of this kind wherein a percentage of distortion can be tolerated without prejudicing the efficient operation of the system. In other words, control of the gain of the auxiliary amplifier by means of automatic control of the voltage applied to the amplifier grid 2002 of the valve 2000 provides a sufficiently wide range of gain variation for effective amplification of the contrast action to be secured, whilst any incidental amplitude distortion incurred at maximum gain is restricted in its effect to slight modification of the wave form of the contrast control voltage which however, does not necessarily appear superimposed on the modulation of the reproduced signal on account of the appreciable time constant of the control circuits. In the case wherein this is reduced to a minimum to secure the maximum expansion effect on transient passages, it is desirable to control the gain of the auxiliary amplifier by means involving the minimum of distortion and in this case it may be advantageous to effect this process through the automatic control of feed-back in a manner analogous to that above described with reference to the circuits of the main amplifier.

Figure 14:
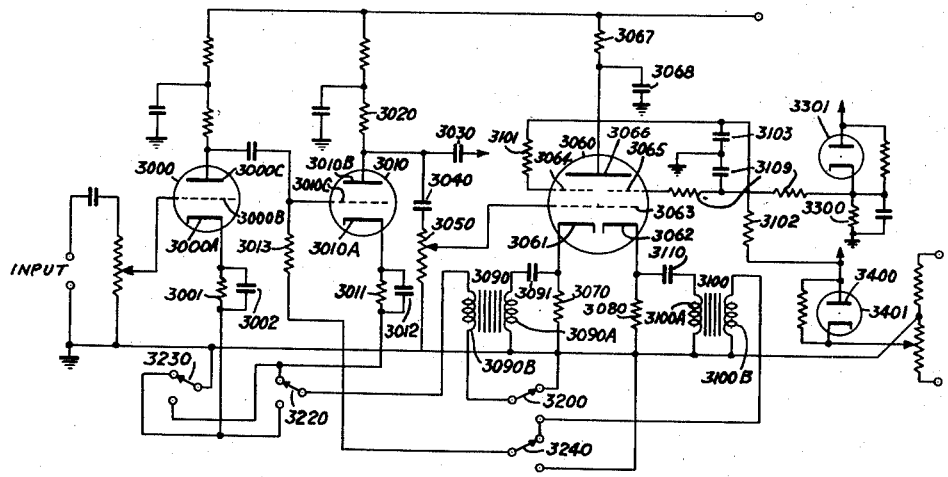
Fig. 14 illustrates a still further circuit arrangement embodying the invention.

In Fig. 14 is shown a further circuit arrangement embodying the invention incorporating feed-back controlling stages of the "cathode follower" type which for the reasons above pointed out has particular application to the present invention.

Referring to Fig. 14, the preliminary stages of the main amplifier over which controlled feed-back is applied, comprise resistance coupled triode stages 3000 and 3010. The output voltages of the second stage 3010 are developed across the anode load resistance 3020 thereof and applied over a condenser 3030 to a succeeding output stage (not shown) and which may assume any of the forms above described. The output voltages of the stage 3010 are also applied over a blocking condenser 3040 to an adjustable feed-back attenuating potentiometer 3050, the slider of which is connected to the control grid 3063 of the dual cathode follower feed-back controlling valve 3060. As shown in the figure, this valve comprises in the same evacuated envelope a pair of adjacent cathodes 3061 and 3062, an inner control grid 3063 common to and extending over the surface of both cathodes, a pair of separate coplanar auxiliary grids 3064 and 3065, of which the grid 3064 is arranged in common with the cathode 3061, that is to say, this grid extends over the area of this cathode only, and the grid 3065 is arranged in common with the cathode 3062, that is to say, this grid extends over the area of this cathode only, and an anode 3066 common to both cathodes. Additional screen grids at high tension potential may be inserted between the inner grid 3063 and the auxiliary grids 3064 and 3065 and/or between these last mentioned grids and the anode 3066 without departing from the scope of the invention. The anode 3066 is supplied with high tension voltage over a resistance 3067 and is earthed for audio frequency voltages over a by-pass condenser 3068. Cathode load resistances 3070 and 3080 are connected between the cathodes 3061 and 3062 respectively and earth. The cathode load resistance 3070 shunt feeds the primary 3090A of a low impedance transformer 3090 over a condenser 3091 whilst the cathode load resistance 3080 shunt feeds the primary 3100 of a further similar transformer 3100 over a condenser 3110. One end of the secondary 3090B of the transformer 3090 is connected to the arm of a single pole, two-way switch 3200, the other end of which is connected to the arm and lower contact respectively of further single pole, two-way switches 3220 and 3230. The lower and upper contacts of the switches 3220 and 3230 are connected together and to the cathode 3000A of the first amplifier stage 3000 over the self-biasing resistance 3001 shunted by the by-pass condenser 3002. Similarly, the upper and lower contacts of the switches 3220 and 3230 are connected together and to the cathode 3010A of the second amplifier stage 3010 over the self biasing resistance 3011 and by-pass condenser 3012. The upper contact of the switch 3200 is connected to the earth line and the lower contact thereof to one end of the secondary 3100A of the transformer 3100 the other end of which is connected to the earth line. The lower contact of the switch 3200 is connected to the upper contact of a further similar switch 3240 the lower contact of which is connected to earth. The arm of the switch 3240 is connected to the low potential end of the grid resistance 3013 of the second amplifier stage 3010. The purpose of the switching just described is to enable a variety of different feed-back circuits to be introduced at will whereby a number of different expansion effects can be secured. With the arms of the switches in the upper positions as shown in the figure, for example, differentially controlled positive and negative feed-back can be introduced over the cathode follower circuits from the output to the input circuits of the second amplifier stage 3010. To effect this result, the connections to the secondary 3090B of the transformer 3090 relative to the primary connections should be in the same direction so that no phase reversal of the feed-back voltages occurs whereas the connections to the secondary 3100B of the transformer 3100 relative to the sense of the primary connection thereof should be such as to supply a phase reversal of the voltages fed back therethrough. With this arrangement, positive feedback occurs from the output anode 3000C to the control grid 3010C of the second amplifier stage 3010, over the circuit including the condenser 3040, the potentiometer 3050, the cathode load resistance 3080, shunt feed condenser 3110, transformer 3100 and grid resistance 3013. The degree of this positive feed-back in operation is automatically controlled in proportion to input signal amplitude by the application of a positive control voltage derived from the cathode resistance 3300 of a diode control rectifier 3301 to the auxiliary grid 3065 over the resistance capacity filter 3109, this grid being initially biased negatively from the lower arm of a potential divider similar to that illustrated with reference to the foregoing arrangements, to the region approaching cut-off so that in the absence of a signal, the positive feed-back is at a minimum or zero increasing only with signal amplitude. The control rectifier 3301 supplying the positive control voltage may be delayed to produce a lower expansion rate in the manner above described. Similarly negative feed-back occurs from the output anode 3019B to the cathode 3010A of the stage 3010 over the circuit including the condenser 3040, the potentiometer 3050, the cathode load resistance 3070, shunt feed condenser 3091, transformer 3090, switch 3220 and by-pass condenser 3012 in shunt with the biasing resistance 3011. The initial degree of negative feed-back path applied over the path just described in the absence of an input audio signal is adjusted by means of the potentiometer 3050 and/or by choice of the ratio of the transformer 3090 to bring the initial gain of the stage 3010 to any desired level, this initially applied negative feed-back being thereafter controlled inversely in accordance with input signal amplitude by means of a negative control voltage applied to the auxiliary grid 3064 of valve 3060 over the resistance capacity filter comprising resistances 3101, and 3102 and by-pass condenser 3103. The negative control voltage is derived from the anode 3400 of a diode control rectifier 340, which method of derivation is shown in detail in the foregoing arrangements. It will therefore be seen that with this setting of the switches 3200, 3220, 3230 and 3240, that differentially controlled positive and negative feed-back is secured over the second amplifier stage 3010. Modifications of this control, e. g. unilateral control, may of course be effected as above described without departing from the scope of the invention. The particular advantages of the arrangement are that feed-back control is effected without unwanted amplification of the feed-back voltages through the adoption of the cathode follower circuit in which conditions of 100% negative feed-back automatically obtains and which also has the effect of practically completely eliminating any incidental distortion introduced into the feed-back voltages in their passage through the feed-back controlling stages, whilst due to the low output impedance of the cathode follower circuit the winding of the feed-back transformers need only be of low inductance and the feed-back voltages may be fed directly into the low impedance cathode circuits of the amplifier stages without the necessity of intervening impedances or affecting other parts of the circuit. In addition, the feed-back transformers may advantageously be of the step-down variety, the exact ratio being best determined in the first place by experiment. If desired with the arrangement just described, the transformer 3090 in the negative feed-back path may be omitted and resistance capacity coupling substituted therefore between the cathode load impedance 3070 and the cathode circuit of the valve 3010 by connecting the condenser 3091 directly to the cathode of the second amplifier valve 3010, the by-pass condenser 3012 being in this case omitted. The same consideration does not apply in the case of the positive feed-back path however, as in this case the transformer 3100 performs the essential function of providing a phase reversal in the voltages fed back from the anode to the grid of the stage 3010.

Considering the operation of the circuit with the arms of the switches in the downward position, it will be seen that the positive and negative feed-back is applied over both amplifier stages 3000 and 3010 that is to say, from the output anode 3010B of the second amplifier stage 3010 to the control grid 3000B of the first stage 3000. Referring to the figure, it will be seen that with the switches in the downward position that the low potential end of the cathode biasing resistance 3011 of the stage 3010 is earthed through the arm of the switch 3230 whilst the low potential end of the grid resistance 3013 thereof is also earthed over the arm of the switch 3240 with the result that the grid circuit of this stage is no longer directly connected to the feed-back circuits. On the other hand, it will now be seen that the cathode circuit of the first amplifier stage 3000 now includes in series the secondaries of the transformers 3090 and 3100 through the arm of the switch 3220 and the arm of the switch 3200, and that therefore the feed-back is now indirectly applied to the grid 3000B of the valve 3000 through the intermediary of its cathode circuit. It will be clear that by adjusting the senses, connections of the secondaries of either transformer relative to the respective primaries thereof, that positive and negative feed-back may be effected over either transformer at will, that is to say, over either of the cathodes 3061 and 3062. In this connection, it need only to be remembered that the positive contrast control voltage should be applied to that one of the grids 3064 and 3065 which is common to the cathode supplying positive feed-back and that the negative such voltage should be applied to the other of the said grids and which is common to the cathode supplying negative feed-back. As in the former case, one of the main advantages of the circuit resides in that the low output impedances of the cathode follower stages readily matches into the cathode impedances of the amplifier stages for the introduction thereinto of the feed-back voltages whilst not affecting the impedance characteristics of the other parts of the circuit; in addition to which unwanted amplification of the feed-back voltages is avoided since the 'gain' of the cathode follower stage is always less than unity, or in other words, this type of stage provides attenuations of the feed-back voltages instead of amplification thereof.

As will be clear to a person skilled in the art a wide variety of modifications of the feed-back circuits just given may be effected without departing from the basic features of the invention set forth above, for example, positive feed-back may be introduced from the output to the input circuits of the second stage only whilst negative feed-back may be applied from the output of the second stage to the input of the first either indirectly through the cathode circuits or directly through the grid circuits of the stages to which the feed-back voltages are applied whilst not departing from the scope of the invention as defined above.

In Fig. 15 is shown a preferred form of resistance capacity coupled output stage specially designed to succeed any of the contrast expansion systems above given wherein this process is effected by differential or unilateral control of feed-back over the preliminary stages of the amplifier whereas in the cases given above wherein the controlled feed-back is applied from the output circuit of the output stage to the input circuit of the same or a penultimate stage, this circuit arrangement of the output stage can be employed with equal advantage. As above pointed out the principal advantage of the arrangement shown in Fig. 15 resides in that a more exactly phase reversed input is applied to the respective grids of the push-pull output valves as the result of which, the operating efficiency of the system is considerably increased in relation to the somewhat simpler system of paraphase connections given in Figs. 3, 7 and 9. Moreover, this condition of exact phase reversal holds over a wider range of audio frequencies than in the case of the simpler arrangement just referred to.

Referring to Fig. 15, there is shown therein a resistance-capacity coupled push-pull output stage which is applicable to any of the embodiments of the invention above described, in particular those illustrated with reference to Figs. 3, 7 and 9, whilst enabling the advantages just set forth to be realised. The advantage of a more exactly phase reversed input operating over a wider audio frequency range is particularly advantageous in maintaining the correct phase of the feed-back voltages existing in either path, over the widest possible frequency range in the case wherein these voltages are derived directly from either anode of the push-pull output stages, as in the case of the arrangement illustrated in Fig. 9. In Fig. 15 the penultimate audio amplifying stage comprises a triode 4000 the anode circuit of which is resistance-capacity coupled to the control grid 4500A of the valve 4500, the first of a pair of triode push-pull output valves 4500 and 5000. The phase reversed input to the grid 5000A of the second push-pull triode 5000 is secured through the medium of a separate phase reversing valve 4013 in the following manner: The output of the penultimate stage 4000 is fed over an attenuating potential divider comprising upper and lower resistance arms 4100 and 4101, the output therefrom being taken from the junction of these resistances and applied over a coupling condenser 4102 and grid resistance 4014 to the grid 4013A of the phase reversing valve 4013. The amplified reverse phase voltages appearing across the anode load resistance 4104 are applied over the coupling condenser 4105 and grid 5000A resistance 4106 to the control grid of the second push-pull output valve 5000. The initial adjustment of the relative values of the resistances 4100 and 4101 is effected to sufficiently attenuate the input voltages to the phase reversing stage 4013 such that the amplified voltages developed across the anode load resistance 4104 thereof and applied to the control grid 5000A of the stage 5000 are equal in amplitude to the input voltages applied from the anode circuit of the penultimate stage 4000 to the grid 4500A of the first push-pull stage 4500, that is to say, to the amplitude of the audio voltages developed across the resistances 4100 and 4101. As will be readily understood, the attenuation provided by the divider 4100 and 4101 to secure this result should be equal to 1/A where A represents the voltage amplification of the stage 4013, this adjustment being best arrived at in practice by experiment. From the foregoing, it will be understood that the audio frequency voltages applied to the respective grids 4500A and 5000A of the push-pull output valves 4500 and 5000 are equal in amplitude but opposite in phase, which is the requisite operating condition for a push-pull input circuit. It should be stated that the circuit just described with reference to Fig. 15 is in accordance with principles well known in the art and per se forms no part of the present invention. As pointed out above however, the arrangement of Fig. 15 represents a highly satisfactory arrangement for the application thereto of the circuits hereinbefore described with reference to and in accordance with, the present invention.

As yet the comments passed on the question of the adjustment of the time constants of the control circuits have not been amplified. In all the foregoing arrangements shown and described with reference to the accompanying drawings, the time constant of the expansion control circuits can be adjusted within fairly wide limits by suitable adjustment of the values of resistance and capacity included in the control circuits; that is to say, in the resistance-capacity filter circuits, the time constant increasing as the capacity increases and vice-versa. By arranging for the capacity to be reasonably small, a very low value of time constant can be introduced into the control circuits corresponding to say, one millionth of a second and which for all practical purposes represents instantaneous operation of the expansion system in response to variations in input signal amplitude; this condition obtaining equally in the cases of the increase and decline in gain respectively, that is to say, the rate of decline in gain with respect to decline in input signal amplitude is substantially equal to the rate of increase in gain with respect to increase in the input signal amplitude and vice-versa. This adjustment of the circuits adapted in all the foregoing arrangements corresponds to conditions required for true contrast expansion in which the gain of the amplifier is at all times proportional to the instantaneous amplitude of the input audio signal and moreover, enables a full expansion effect to be secured on transient passages. It is of course, possible to modify the time constants of the control circuits to suit particular requirements without in any way departing from the scope of this invention. Thus it is popular practice to introduce into circuits of this kind what is commonly described as an "asymmetrical" delay in the operation of the control circuits, that is to say, the rise in gain in response to an increase in the amplitude of the input audio signal is arranged to take place as nearly as possible instantaneously, whereas a delay is imposed in the reverse process so that the decline in gain takes place comparatively slowly reaching its initial value considerably after the input signal has decreased to its original value before expansion commenced. Whilst this arrangement enables certain artificial aural effects to be secured it departs from the conditions above stated which apply to true contrast expansion, since after the expansion effect taking place on a loud transient passage succeeding weaker passages are disproportionately expanded, that is to say, to an excessive extent in relation to their amplitude, a result which corresponds in effect to amplitude distortion of the reproduced signal. This effect is of course, quite readily arranged to take place as for example by arranging a diode or similar rectifier in series or parallel with the control circuits such that the unilateral conducting properties thereof serves to give an instantaneous increase to the expansion voltage and a comparatively slow decline thereof. Since this arrangement however involves the serious technical disadvantage above described however such arrangements are not shown included with the present invention. In cases wherein it is desired to secure an artificial aural effect which however does not correspond to the conditions obtaining in the case of true contrast expansion it is possible to include such an "asymmetrical" delaying arrangement in the control circuits of the systems above described without in any way departing from the scope or meaning of the present invention.

What is claimed is:

1. An audio frequency valve amplifying system comprising a plurality of valve stages in cascade, a first feed-back path arranged from the output circuit of said amplifying system to the input circuit of said amplifying system and arranged to supply positive audio frequency feedback to the system, a second feed-back path arranged from the output circuit of said amplifying system to the input circuit of said amplifying system and arranged to supply negative audio frequency feed-back to the system, means coupled to the input of said amplifying system for deriving two control voltages proportional to the amplitude of the input audio signal to be amplified, separate means to differentially control the relative degree of positive feed-back and negative feed-back respectively supplied by said paths to the system, each of said differential control means coupled between different of said feed-back paths and said voltage deriving means, said differential control means including means for selectively disconnecting said voltage deriving means from said differential control means, said disconnecting means adapted to operate when the input audio signals have attained a predetermined amplitude, whereby the degree of said positive audio frequency feed-back is arranged to increase and the degree of said negative feedback is caused to diminish as the amplitude of said input audio signal increases and vice versa, whereby the overall effective gain of said amplifying system is caused to vary in the same sense as the said variations in input audio signal to be amplified, to effectively produce an effect corresponding to volume expansion of said signal.

2. An audio frequency amplifying system in accordance with claim 1 wherein there is provided in the circuit of one of said feedback paths a frequency discriminating impedance, whereby the relative degrees of said feedback is caused to vary with frequency in such a manner that the frequency response of said amplifying system is caused to be a function of the gain level and therefore the amplitude of the input audio signal.

3. A system in accordance with claim 2 wherein in each of the circuits of said positive feedback and said negative feedback paths includes a high-pass filter providing increasing attenuation as the audio frequency is lowered whereby the degree of bass response relative to treble response is caused to automatically increase as the amplitude of the input audio signal diminishes and vice-versa such that the defective bass response of the ear at low volume levels is substantially compensated for.

4. A system in accordance with claim 3 further comprising an impedance serially connected in each of said feedback paths, each of said impedances having a reactance for equalizing the phase of the voltages fed back with respect to frequency, whereby the phase of the regenerative voltages existing in said positive feedback path and the phase of the degenerative voltages existing in said negative feedback path remains substantially constant throughout the entire range of audio frequencies.

5. A system in accordance with claim 4, wherein said amplifying system has various stray capacities distributed therein and wherein said impedances comprise a reactive impedance included in one of said feedback circuits for annulling the phase shift produced in the voltages fed back towards the upper end of the audio frequency scale, due to the action of said various stray capacities located in shunt with the resistive load impedances of said valves.

6. A system in accordance with claim 5 wherein said positive feedback path and said negative feedback path comprise separate valve stages, each separate valve stage having an input circuit and an output circuit, the input circuits of each of said separate valve stages coupled to the anode circuit of a stage in said amplifying system, one of said separate valve stages having its output circuit coupled to the grid circuit of a stage in said amplifying system, and the other of said separate valve stages having its output circuit coupled to the cathode circuit of a stage in said cascaded amplifying system.

7. A system in accordance with claim 6 wherein each of said separate valve stages further comprises an auxiliary grid electrode, the auxiliary grid electrode of each of said separate valve stages coupled to a difference of said voltage deriving means, whereby the control voltages derived from the input audio signal are respectively applied to said separate valve stages.

8. A system in accordance with claim 7 wherein each of said separate valve stages further comprises adjustable attenuating means for adjusting the initial degree of positive and negative feedback applied to said amplifying system in the absence of an input audio signal.

9. A system in accordance with claim 8 wherein said adjustable attenuating means comprises a manually adjustable potentiometer connected to the input circuit of each of said separate valve stages.

10. A system in accordance with claim 8 wherein said adjustable attenuating means comprises separate, pre-set feedback circuits from the output to the input of said separate valve stages, whereby excessive amplification and distortion of the feedback voltages existing in either of said paths through said separate valve stages comprising said feedback paths, is offset.

11. An audio frequency valve amplifying system comprising a plurality of valve stages in cascade, a first feedback path aranged from the output circuit of said amplifying system to the input circuit of said amplifying system and arranged to supply positive audio frequency feedback to the system, a second feedback path arranged from the output circuit of said amplifying system to the input circuit of said amplifying system and arranged to supply negative audio frequency feedback to the system, means coupled to the input of said amplifying system for deriving two control voltages proportional to the amplitude of the input audio signal to be amplified, separate means to differentially control the relative degree of positive feedback and negative feedback respectively supplied by said paths to the system, each of said differential control means coupled between different of said feedback paths and said voltage deriving means, said differential control means comprising separate valve stages, each having an input circuit and an output circuit, the input circuits of each of said separate valve stages coupled to different of said control voltage deriving means, a pair of separate high pass filter circuits, each coupled to the output circuit of respective of said separate valve stages for regulating the degree of feedback passing therethrough with respect to frequency, and in accordance with the amplitude of the input audio signal to be amplified, to effectively produce compensation of selected frequencies of the amplified signal.

12. A system in accordance with claim 11, wherein said separate valve stages providing the feedback paths are connected to the preceding valve stages in said cascaded amplifier system as cathode-follower circuits, whereby the overall gain of the feedback-controlled stages is made to be substantially less than unity.

13. A system in accordance with claim 11, wherein said separate valve stages providing the feedback paths are connected to preceding valve stages of said cascaded system in cathode-follower circuits and wherein there is further provided separate adjustable audio frequency attenuating means coupled between the input circuit of respective of said separate valve stages and the output circuit of one of valve stages of said cascaded system, a separate resistive load impedance included in the output circuit of each of said separate valve stages and a separate audio frequency coupling circuit disposed between the output circuit of respective of said separate valve stages and the input circuit of a preceding valve stage of said cascaded amplifying system.

14. A system in accordance with claim 13, wherein at least one of said audio frequency coupling circuits is a low impedance circuit feeding directly to a point of low impedance in the input circuit of a preceding valve stage of said cascaded amplifying system.

15. A system in accordance with claim 14, wherein said low impedance coupling circuit includes a low impedance audio frequency transformer having the relative senses of the connections to its input primary and output secondary windings arranged to supply a phase reversal of the voltages fed back therethrough, whereby a positive feedback may be secured from the output to the input circuit of the valve stage of said cascaded amplifying system.

16. An audio frequency valve amplifying system comprising a plurality of valve stages in cascade, a first feedback path aranged from the output circuit of said amplifying system to the input circuit of said amplifying system and arranged to supply positive audio frequency feedback to the system, a second feedback path arranged from the output circuit of said amplifying system to the input circuit of said amplifying system and arranged to supply negative audio frequency feedback to the system, means coupled to the input of said amplifying system for deriving two control voltages proportional to the amplitude of the input audio signal to be amplified, separate means to differentially control the relative degree of positive feedback and negative feedback respectively, supplied by said paths to the system, each of said differential control means coupled between different of said feedback paths and said voltage deriving means, said differential control means comprising separate valves arranged in cathode-follower circuits, each of said separate valves having a control electrode in an input circuit and an output electrode in an output circuit, respective, of said control electrodes adapted to be coupled to different of said voltage deriving means, said output electrodes coupled to a cascaded valve stage of said system, separate means coupled to the electron path of said separate valves for selectively disconnecting said voltage deriving means from said control electrodes, said disconnecting means adapted to operate when the input audio signals have attained a predetermined amplitude, whereby the degree of said positive audio frequency feedback is arranged to increase and the degree of said negative feedback is caused to diminish as the amplitude of said input audio signal increases and vice-versa, whereby the overall effective gain of said amplifying system is caused to vary in the same sense as the said variations in input audio signal to be amplified, to effectively produce an effect corresponding to volume expansion of said signal.

17. A system in accordance with claim 16 wherein said separate valves comprise a single envelope, a common anode, a pair of adjacent cathode electrodes, a single control electrode common to and extending throughout the combined length of both of said control electrodes, a pair of auxiliary control electrodes, the first of said auxiliary electrodes being arranged to operate with and extend over the surface of the first of said cathode electrodes, the second of said auxiliary electrodes being arranged to operate with and extend over the surface of the second of said cathode electrodes and a single anode electrode arranged in common and to operate with both of said cathodes, said control electrodes and said auxiliary electrodes disposed between said anode and said cathodes.

18. A system in accordance with claim 17, further comprising an adjustable audio frequency attenuating means, said attenuating means coupled between the output circuit of a valve stage of said cascaded amplifying system and said single control electrode, a pair of separate load impedances, a first of said impedances coupled between one of said cathode electrodes and the input circuit of a valve stage of said cascaded amplifying system in a sense to provide positive audio feedback voltages to said input circuit, the other of said impedances coupled between the other of said cathode electrodes and the input circuit of a valve stage of said cascaded amplifying system in a sense to provide negative audio feedback voltages to said input circuit, the relative degrees of both of said positive feedback and said negative feedback being differentially controlled in accordance with the positive and negative control voltages derived from said voltage deriving means.

19. A system in accordance with claim 18, further comprising two-position switching means, said switching means in a first position adapted to couple said separate load impedances to the input circuit of a valve stage in said cascaded amplifying system from the output circuit of which said feedback voltages are initially derived, said switching means in a second position adapted to couple said separate load impedances to the input circuit of a valve stage in said cascaded amplifying system preceding the output circuit from which said feedback voltages are initially derived.

ERIC PETER RUDKIN.

REFERENCES CITED

The following references are of record in the file of this patent:

UNITED STATES PATENTS

| Number | Name | Date |
| --- | --- | --- |
| 2,230,483 | Cage | Feb. 4, 1941 |
| 2,306,859 | Berthold | Dec. 29, 1942 |
| 2,343,207 | Schrader et al. | Feb. 29, 1944 |
| 2,367,110 | Fayers | Jan. 9, 1945 |
| 2,374,071 | Barton | Apr. 17, 1945 |